US012084897B2

(12) United States Patent
Umezawa et al.

(10) Patent No.: US 12,084,897 B2
(45) Date of Patent: Sep. 10, 2024

(54) CONTROL APPARATUS AND CONTROL METHOD

(71) Applicant: FUJI ELECTRIC CO., LTD., Kanagawa (JP)

(72) Inventors: Kotaro Umezawa, Tokyo (JP); Takuya Watanabe, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 275 days.

(21) Appl. No.: 17/652,140

(22) Filed: Feb. 23, 2022

(65) Prior Publication Data

US 2022/0307297 A1 Sep. 29, 2022

(30) Foreign Application Priority Data

Mar. 25, 2021 (JP) ................................ 2021-052025

(51) Int. Cl.

| | |
|---|---|
| ***E05B 81/80*** | (2014.01) |
| ***E05B 81/06*** | (2014.01) |
| ***E05B 81/64*** | (2014.01) |
| ***E05B 83/36*** | (2014.01) |
| ***E05F 15/60*** | (2015.01) |

(52) U.S. Cl.

CPC .............. *E05B 81/80* (2013.01); *E05B 81/06* (2013.01); *E05B 81/64* (2013.01); *E05B 83/363* (2013.01); *E05F 15/60* (2015.01)

(58) Field of Classification Search

CPC .......... E05B 81/80; E05B 81/06; E05B 81/64; E05B 83/363; E05F 15/60

See application file for complete search history.

(56) References Cited

FOREIGN PATENT DOCUMENTS

| | | |
|---|---|---|
| EP | 2404805 | 1/2012 |
| JP | H11-180304 | 7/1999 |
| JP | 2010-068403 | 3/2010 |
| JP | 5117614 | 1/2013 |
| WO | 2010/100988 | 9/2010 |

OTHER PUBLICATIONS

Office Action mailed on Jun. 1, 2021 issued with respect to the basic Japanese Patent Application No. 2021-052025.

*Primary Examiner* — Michael D Lang

(74) *Attorney, Agent, or Firm* — IPUSA, PLLC

(57) ABSTRACT

A control apparatus includes a first controller which controls an operation of a door of a railway vehicle, a second controller capable of controlling the operation of the door, and a diagnosis tester. The diagnosis tester performs a diagnosis related to an abnormality in the second controller when performing a start process which accompanies turning on power of the control apparatus.

12 Claims, 11 Drawing Sheets

CONTROL APPARATUS AND CONTROL METHOD

CROSS-REFERENCE TO RELATED APPLICATIONS

This application is based upon and claims priority to Japanese Patent Application No. 2021-052025, filed on Mar. 25, 2021, the entire contents of which are incorporated herein by reference.

BACKGROUND OF THE INVENTION

1. Field of the Invention

The present disclosure relates to control apparatuses and control methods.

2. Description of the Related Art

A technique for making a door control system redundant (or duplexing the door control system) by providing a main door control system and a standby door control system is known from Japanese Patent No. 5117614, for example.

Japanese Patent No. 5117614 proposes a first controller and a second controller which are capable of controlling a motor for opening and closing a door, wherein the first controller normally controls the motor, and the second controller takes over the control of the motor when an abnormality is generated in the first controller.

However, while a railway vehicle is in service, if an abnormality is generated in the main system in a state where an abnormality is already (or potentially) generated in the standby system, the control of the door cannot be taken over by the standby system even when the control is switched from the main system to the standby system. As a result, the door, which is a target to be controlled, may become unusable while the railway vehicle is in service. For this reason, there is a possibility of a significantly disrupting the service of railway vehicle.

SUMMARY OF THE INVENTION

Accordingly, in view of the problem described above, one object according to one aspect of the present disclosure is to provide a technique capable of appropriately operating a redundant control system for a door of a railway vehicle.

According to one aspect of the embodiments of the present disclosure, a control apparatus includes a first controller configured to control an operation of a door of a railway vehicle; a second controller capable of controlling the operation of the door; and a diagnosis tester configured to perform a diagnosis related to an abnormality in the second controller when performing a start process which accompanies turning on power of the control apparatus.

According to another aspect of the embodiments of the present disclosure, a control method to be executed by a control apparatus including a first controller configured to control an operation of a door of a railway vehicle, and a second controller capable of controlling the operation of the door, includes performing a diagnosis related to an abnormality in the second controller when performing a start process which accompanies turning on power of the control apparatus.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF THE PREFERRED EMBODIMENTS

Hereinafter, embodiments of the present disclosure will be described with reference to the accompanying drawings.

[Configuration Related to Door Opening or Closing Operation]

First, a configuration related to the opening or closing operation of a door 80 of a railway vehicle 1 will be described, with reference to FIG. 1 through FIG. 4.

Figure 1:
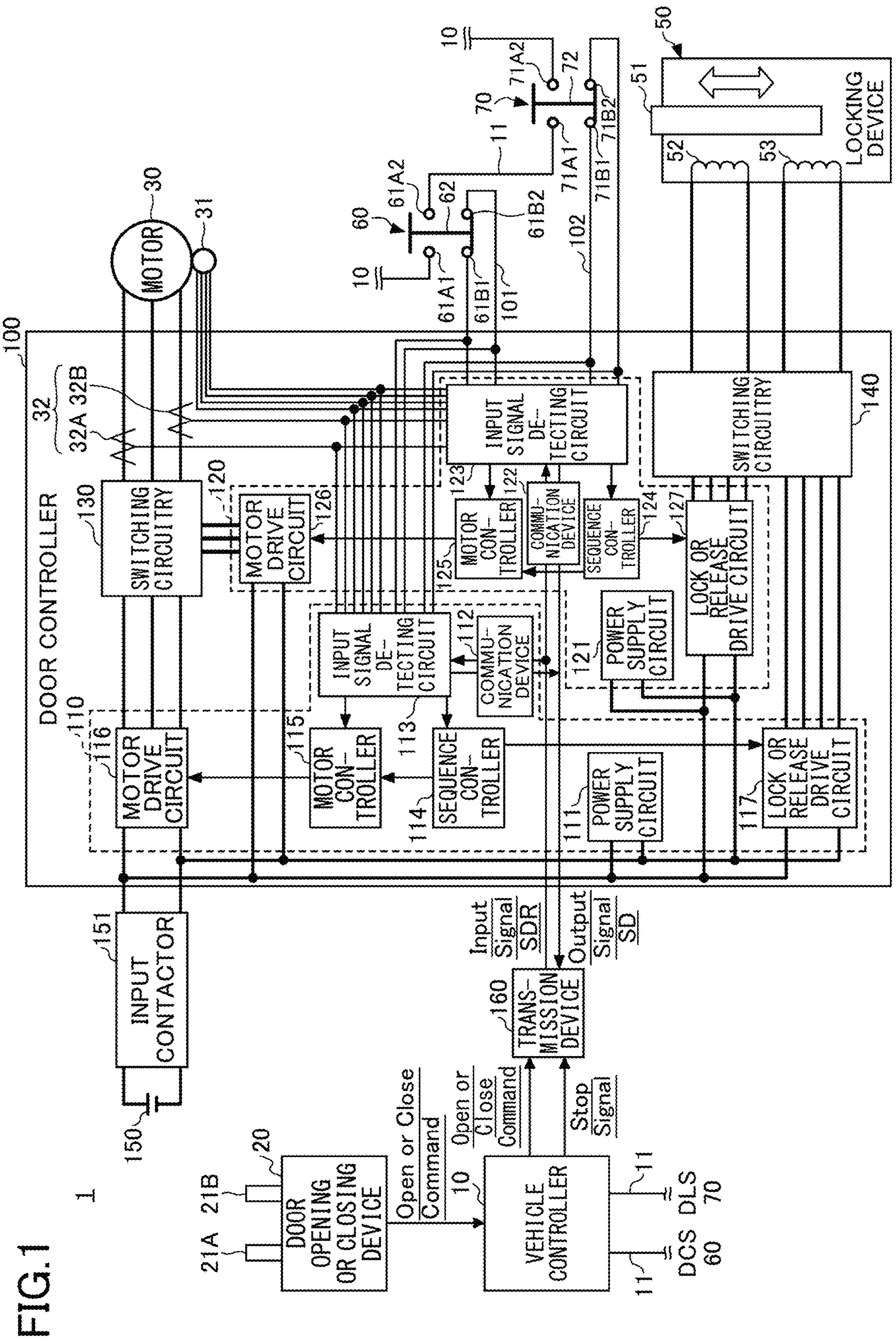
FIG. 1 is a block diagram illustrating an example of a configuration related to a door opening or closing operation of a railway vehicle.
Figure 2:
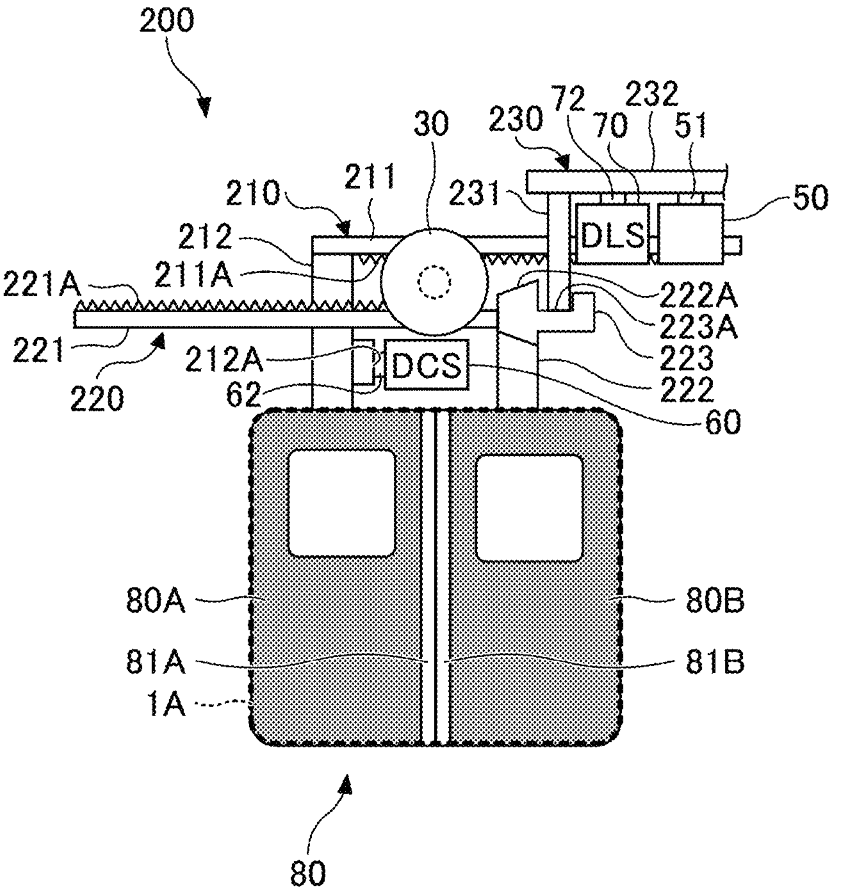
FIG. 2 is a schematic diagram illustrating an example of arrangement and configuration of a door and a door drive mechanism of the railway vehicle.
Figure 3:
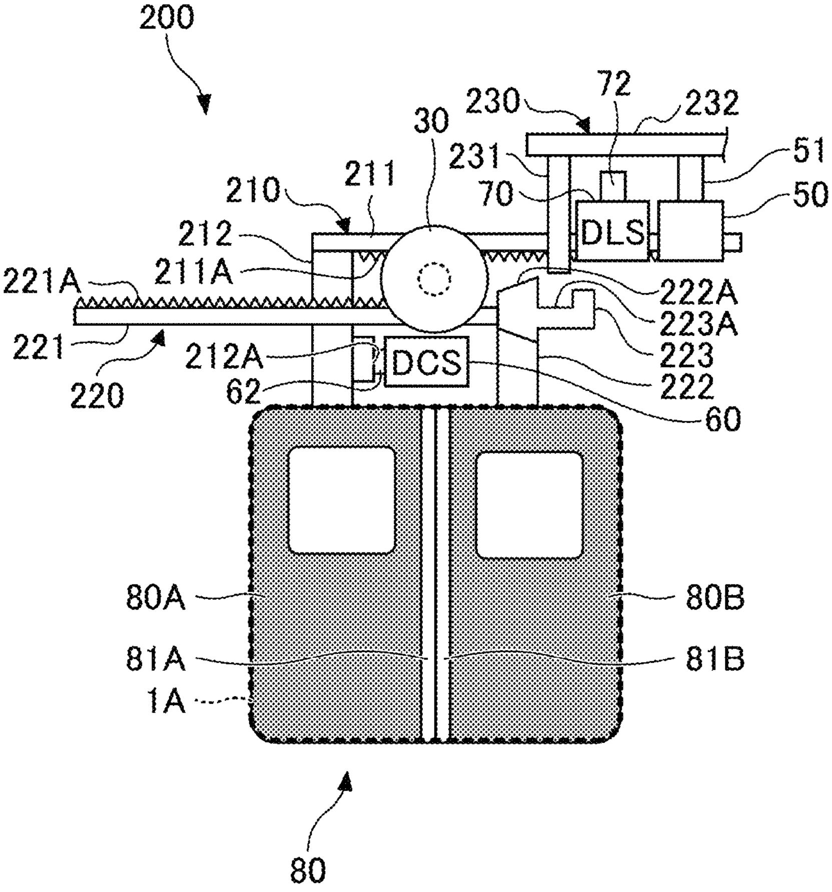
FIG. 3 is a schematic diagram illustrating the example of the arrangement and configuration of the door and the door drive mechanism of the railway vehicle.
Figure 4:
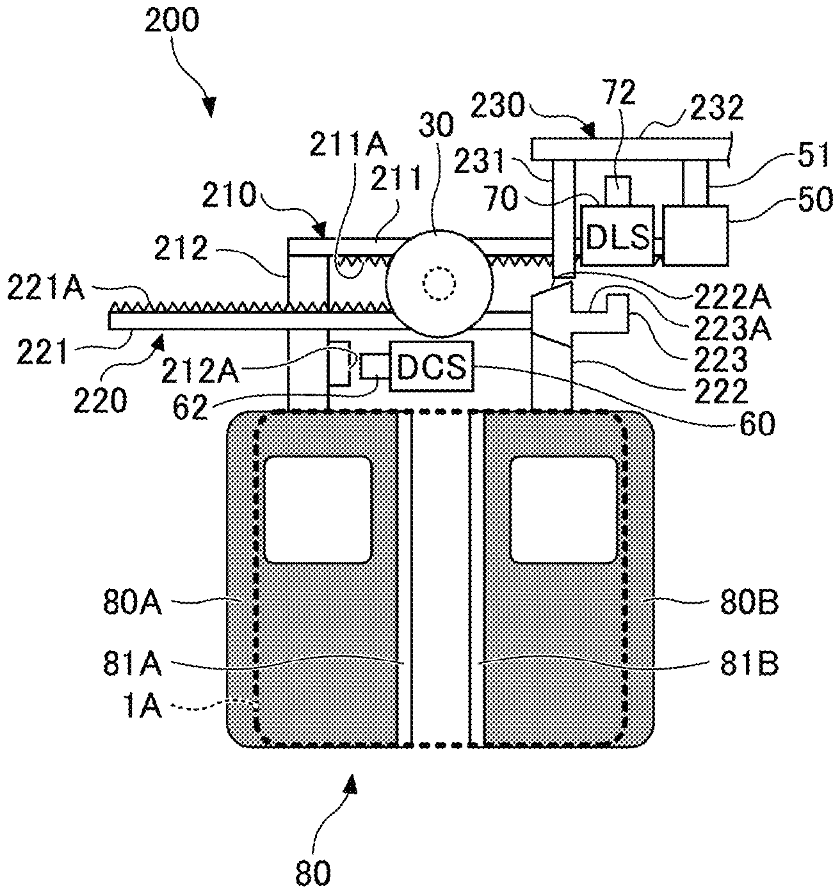
FIG. 4 is a schematic diagram illustrating the example of the arrangement and configuration of the door and the door drive mechanism of the railway vehicle.

FIG. 1 is a block diagram illustrating an example of the configuration related to the opening or closing operation of the door 80 of the railway vehicle 1. FIG. 2 through FIG. 4 are schematic diagrams illustrating an example of arrangement and configuration of the door 80 and a door drive mechanism 200 of the railway vehicle 1. More particularly, FIG. 2 is a schematic diagram illustrating the door 80 and the door drive mechanism 200 in a fully closed and locked state of the door 80. FIG. 3 is a schematic diagram illustrating the door 80 and the door drive mechanism 200 in a fully closed and released state. FIG. 4 is a schematic diagram illustrating the door 80 and the door drive mechanism 200 during an opening operation or a closing operation.

As illustrated in FIG. 1 through FIG. 4, the railway vehicle 1 includes a vehicle controller 10, a door opening or closing device 20, a motor 30, an encoder 31, a current sensor 32, a locking device 50, a Door Close Switch (DCS) 60, a Door Lock Switch (DLS) 70, and the door 80. The railway vehicle 1 also includes a door controller 100, a battery 150, an input contactor 151, a transmission device 160, and the door drive mechanism 200.

The vehicle controller 10 controls the operation of the railway vehicle 1. In the case of a multiple-car train including multiple railway vehicles 1 that are coupled, for example, one vehicle controller 10 is provided in each of a driver's cab of the first railway vehicle 1, and a conductor's cab of the last railway vehicle 1. In addition, in the case of a single-car train, for example, one vehicle controller 10 is provided in each of the driver's cab and the conductor's cab located at a front end and a rear end of the railway vehicle 1, respectively.

The vehicle controller 10 outputs a stop signal indicating that the railway vehicle 1 is stopped at a station or the like, to the door controller 100. Further, the vehicle controller 10 outputs an open command indicating the opening operation of the door 80, or a close command indicating the closing operation of the door 80, which is input from the door opening or closing device 20, to the door controller 100.

The vehicle controller 10 is connected to a wiring 11 which transmits an interlock signal. Both ends of the wiring 11 are connected to the vehicle controller 10, and the DCS 60 and the DLS 70 are provided on the wiring 11. When both the DCS 60 and the DLS 70 are in an on state, the wiring 11 is in a conduction state, and the interlock signal has a high (H) level. The vehicle controller 10 determines that the railway vehicle 1 is in a state capable of providing service when the interlock signal has the H level. In other words, the railway vehicle 1 becomes capable of providing service, when the interlock signal makes a transition from a low (L) level to the H level.

The door opening or closing device 20 is used by a train crew (for example, a conductor) of the railway vehicle 1, in order to perform the opening or closing operation of the door 80. The door opening or closing device 20 includes an open switch 21A, and a close switch 21B. For example, when the open switch 21A is operated while the railway vehicle 1 is stopped, the door opening or closing device 20 outputs an open command, which rises from the L level to the H level, to the vehicle controller 10. For example, when the close switch 21B is operated while the railway vehicle 1 is stopped, the door opening or closing device 20 outputs a close command, which falls from the H level to the L level, to the vehicle controller 10.

The motor 30 (an example of an electric motor) opens and closes the door 80 by driving the door 80. The motor 30 is a rotor driven by three-phase AC driving power, for example.

The door 80 may be driven by a linear motor driven by the three-phase AC driving power, or by a DC motor.

The encoder 31 detects a rotational position (rotation angle) of a rotational shaft of the motor 30. The encoder 31 detects the rotational position (rotation angle) and a speed of rotation during one revolution of the rotational shaft of the motor 30, for example. The encoder 31 outputs a detection signal including information related to the rotational position of the rotational shaft of the motor 30, and the detection signal is captured by the door controller 100.

The current sensor 32 senses a current of the three-phase AC driving power supplied from the door controller 100 to the motor 30. The current sensor 32 includes current sensors 32A and 32B which sense currents in two of the three power lines of the U-phase, the V-phase, and the W-phase connecting between the door controller 100 and the motor 30. For example, the current sensor 32A senses the current of the power line of the U-phase, and the current sensor 32B senses the current of the power line of the W-phase. In addition, the current sensor 32 may include a current sensor which senses the current of the remaining power line. For example, as illustrated in FIG. 1, the current sensor 32 may be built into the door controller 100, or may be provided externally to the door controller 100. The sensed signals of the current sensor 32 (current sensors 32A and 32B) are captured by a main system controller 110 and a standby system controller 120, which will be described later.

The locking device 50 locks or releases the door 80. The locking device 50 includes a pin 51, and coils 52 and 53, for example, and is implemented by a bi-directional (or two-way) self holding solenoid. The coils 52 and 53 are connected to the door controller 100, respectively.

The pin 51 of the locking device 50 protrudes from a housing of the locking device 50, when the coil 52 is energized by the door controller 100. In this case, a locking pin 230, which will be described later, moves in a releasing direction (or unlocking direction), to release (or unlock) the door 80. In addition, because the locking device 50 is the self holding type, the pin 51 continues to protrude from the housing of the locking device 50 even after the energizing of the coil 52 is canceled. Hence, it is possible to maintain the released state (or unlocked state) of the door 80.

The pin 51 of the locking device 50 is drawn into the housing of the locking device 50, when the coil 53 is energized by the door controller 100. In this case, the locking pin 230, which will be described later, moves in a locking direction, to lock the door 80. Moreover, because the locking device 50 is the self holding type, the pin 51 of the locking device 50 continues to be drawn into the housing of the locking device 50 even after the energizing of the coil 53 is canceled. Thus, it is possible to maintain the locked state of the door 80.

The DCS 60 senses the open (or opened) or closed state of the door 80 of the railway vehicle 1. The DCS 60 is implemented by a limit switch which is pressed by an action of the door 80, when the door 80 moved to the fully closed position, for example.

The DCS 60 includes fixed contacts 61A1 and 61A2, fixed contacts 61B1 and 61B2, and a movable contact 62.

The fixed contacts 61A1 and 61A2 are arranged in series with the wiring 11, in a manner that segments the wiring 11. Hereinafter, the fixed contacts 61A1 and 61A2 may also be referred to as "A-contacts" of the DCS 60, for the sake of convenience.

The fixed contacts 61B1 and 61B2 are arranged in series with a wiring 101, in a manner that segments the wiring 101 having both ends thereof connected to the door controller 100. Hence, the door controller 100 can recognize an on or off state of the DCS 60, according to a H-level signal or a L-level signal indicating a conducting or non-conducting state of the fixed contacts 61B1 and 61B2, respectively. Hereinafter, the fixed contacts 61B1 and 61B2 may also be referred to as "B-contacts" of the DCS 60, for the sake of convenience.

The movable contact 62 moves in an axial direction (up-down direction in FIG. 1), to put either the fixed contacts 61A1 and 61A2 or the fixed contacts 61B1 and 61B2 to a conducting state. In a state where no external force is applied to the movable contact 62 of the DCS 60, the movable contact 62 puts the fixed contacts 61B1 and 61B2 in the conducting state, that is, the B-contacts are put into the on state, and the A-contacts are put into the off state. On the other hand, when the movable contact 62 of the DCS 60 is pressed by the action of the door 80, as will be described later, the movable contact 62 puts the fixed contacts 61A1 and 61A2 in the conducting state, that is, the A-contacts are put into the on state, and the B-contacts are put into the off state. Then, when the DCS 60 returns to the state where the movable contact 62 is not pressed by the action of the door 80, the movable contact 62 puts the fixed contacts 61B1 and 61B2 in the conducting state, that is, the B-contacts are put into the on state, and the A-contacts are put into the off state.

Hereinafter, an on state of the DCS 60 refers to the on state of the A-contacts of the DCS 60 (that is, the off state of the B-contacts), and an off state of the DCS 60 refers to the off state of the A-contacts of the DCS 60 (that is, the on state of the B-contacts). In other words, the on state of the DCS 60 indicates a fully closed state where the door 80 is fully closed, and the off state of the DCS 60 indicates an open (or opened) state where the door 80 is open.

The DLS 70 senses whether or not the door 80 is locked. More particularly, the DLS 70 senses the locked state of the door 80. The DLS 70 is implemented by a limit switch which is pressed by the action of the locking pin 230, when the locking pin 230 of the door 80 moves to a locked position, for example.

The DLS 70 includes fixed contacts 71A1 and 71A2, fixed contacts 71B1 and 71B2, and a movable contact 72.

The fixed contacts 71A1 and 71A2 are arranged in series with the wiring 11, in a manner that segments the wiring 11. Hereinafter, the fixed contacts 71A1 and 71A2 may also be referred to as "A-contacts" of the DLS 70, for the sake of convenience.

The fixed contacts 71B1 and 71B2 are arranged in series with a wiring 102, in a manner that segments the wiring 102 having both ends thereof connected to the door controller 100. Hence, the door controller 100 can recognize an on or off state of the DLS 70, according to a H-level signal or a L-level signal indicating a conducting or non-conducting state of the fixed contacts 71B1 and 71B2, respectively. Hereinafter, the fixed contacts 71B1 and 71B2 may also be referred to as "B-contacts" of the DLS 70, for the sake of convenience.

The movable contact 72 moves in the axial direction (up-down direction in FIG. 1), to put either the fixed contacts 71A1 and 71A2 or the fixed contacts 71B1 and 71B2 to a conducting state. In a state where no external force is applied to the movable contact 72 of the DLS 70, the movable contact 72 puts the fixed contacts 71B1 and 71B2 in the conducting state, that is, the B-contacts are put into the on state, and the A-contacts are put into the off state. On the other hand, when the movable contact 72 of the DLS 70 is pressed by the action of the locking pin 230, the movable contact 72 puts the fixed contacts 71A1 and 71A2 in the conducting state, that is, the A-contacts are put into the on state, and the B-contacts are put into the off state. Then, when the DLS 70 returns to the state where the movable contact 72 is not pressed by the action of the locking pin 230, the movable contact 72 puts the fixed contacts 71B1 and 71B2 in the conducting state, that is, the B-contacts are put into the on state, and the A-contacts are put into the off state.

Hereinafter, an on state of the DLS 70 refers to the on state of the A-contacts of the DLS 70 (that is, the off state of the B-contacts), and an off state of the DLS 70 refers to the off state of the A-contacts of the DLS 70 (that is, the on state of the B-contacts). In other words, the on state of the DLS 70 indicates a locked state where the door 80 is locked, and the off state of the DLS 70 indicates a released state (or unlocked state) where the door 80 is released (or unlocked).

When the door 80 is fully open and released, both the A-contacts of the DCS 60 and the A-contacts of the DLS 70 are put into the open state, the wiring 11 assumes the conducting state, and the interlock signal assumes the H level.

The door 80 is a bi-parting sliding door provided at an opening 1A located on the left and right sides of the railway vehicle 1. The door 80 includes doors 80A and 80B.

Door stop rubbers 81A and 81B are provided at portions of the doors 80A and 80B respectively abutting each other in the fully closed state of the door 80. The door stop rubbers 81A and 81B are provided in a range extending from a top end to a bottom end, respectively, at mating portions of the doors 80A and 80B.

The door controller 100 (an example of a controller or a control device) controls the opening or closing operation of the door 80. The door controller 100 is provided for each of a plurality of doors 80 provided in railway vehicle 1.

Functions of the door controller 100 may be implemented by arbitrary hardware or an arbitrary combination of hardware and software. The door controller 100 may be generally formed by a computer including a processor such as a Central Processing Unit (CPU) or the like, a memory device such as a Random Access Memory (RAM) or the like, an auxiliary storage device such as a Read Only Memory (ROM) or the like, and an interface device configured to input and output signals, data, and commands between the computer and an external device.

The door controller 100 includes the main system controller 110, the standby system controller 120, a switching circuitry 130, and a switching circuitry 140.

The main system controller 110 (an example of a first controller) controls the opening or closing operation of the door 80. The main system controller 110 includes a power supply circuit 111, a communication device 112, an input signal detecting circuit 113, a sequence controller 114, a motor controller 115, a motor drive circuit 116, and a lock or release drive circuit 117.

The power supply circuit 111 functions as a driving power source for various devices of the main system controller 110. The power supply circuit 111 uses the power of a relatively high voltage (for example, 100 V) supplied from the battery 150 to the door controller 100, to generate power of a relatively low voltage (for example, 5 V or lower) for driving devices of the main system controller 110.

The communication device 112 performs two-way communication with the transmission device 160 which is provided externally to the door controller 100.

The input signal detecting circuit 113 detects various input signals input from the outside of the door controller 100.

In addition, the input signal detecting circuit 113 performs various signal processing based on the detected input signals.

For example, when the input signal detecting circuit 113 detects predetermined signals from the input signals, the input signal detecting circuit 113 transmits the predetermined signals to the sequence controller 114 and the motor controller 115. In other words, the input signal detecting circuit 113 extracts (or selects) the signals required for the control of the sequence controller 114 and the motor controller 115, from the plurality of kinds of input signals, and transmits the extracted (or selected) signals to the sequence controller 114 and the motor controller 115. Accordingly, the sequence controller 114 can appropriately perform a sequence control which will be described later, and the motor controller 115 can appropriately drive and control the motor 30, based on the signals input from the input signal detecting circuit 113.

Figure 5:
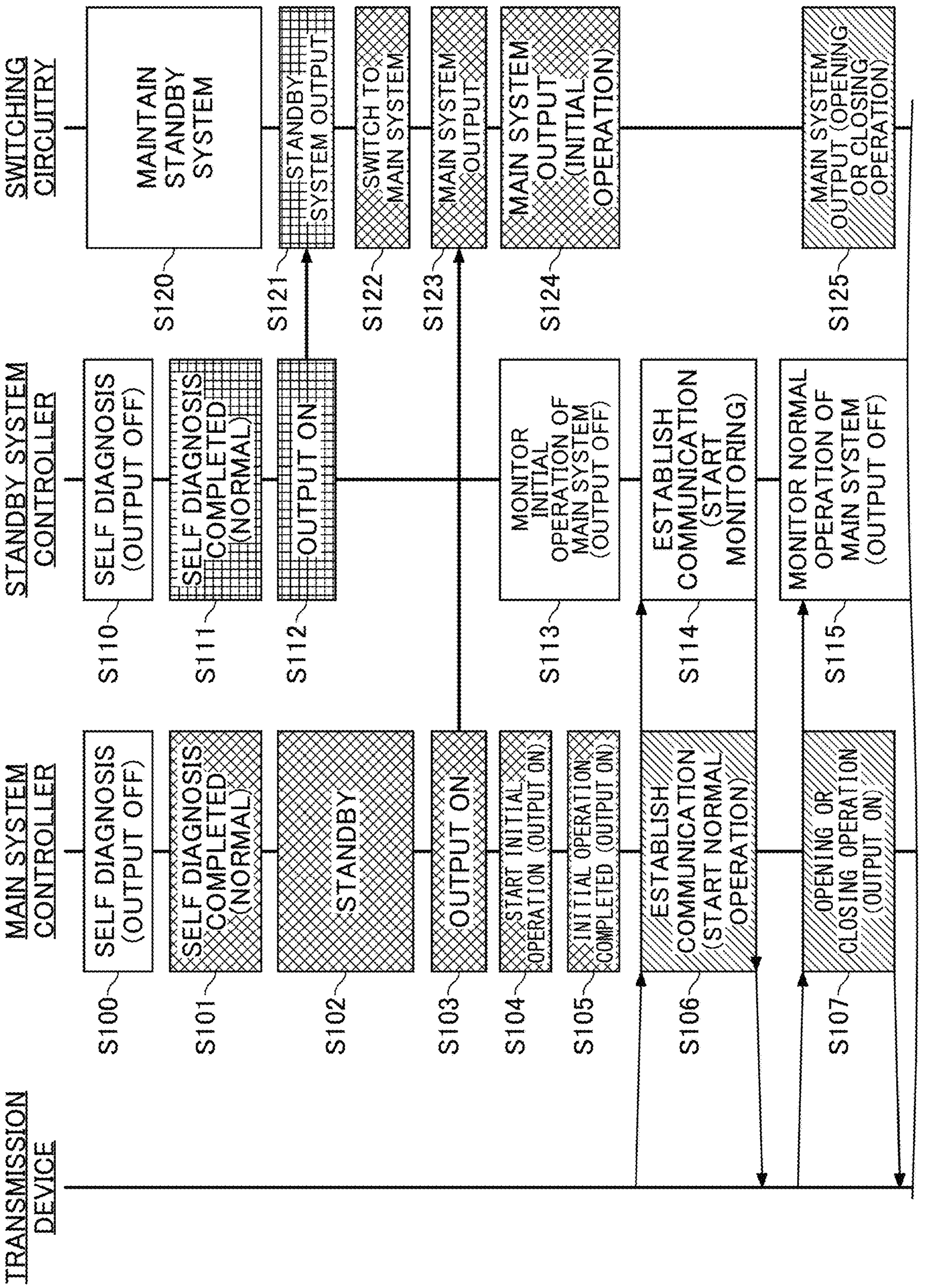
FIG. 5 is a flow chart illustrating a first example of a start sequence process of a door controller when turning on power.
Figure 6:
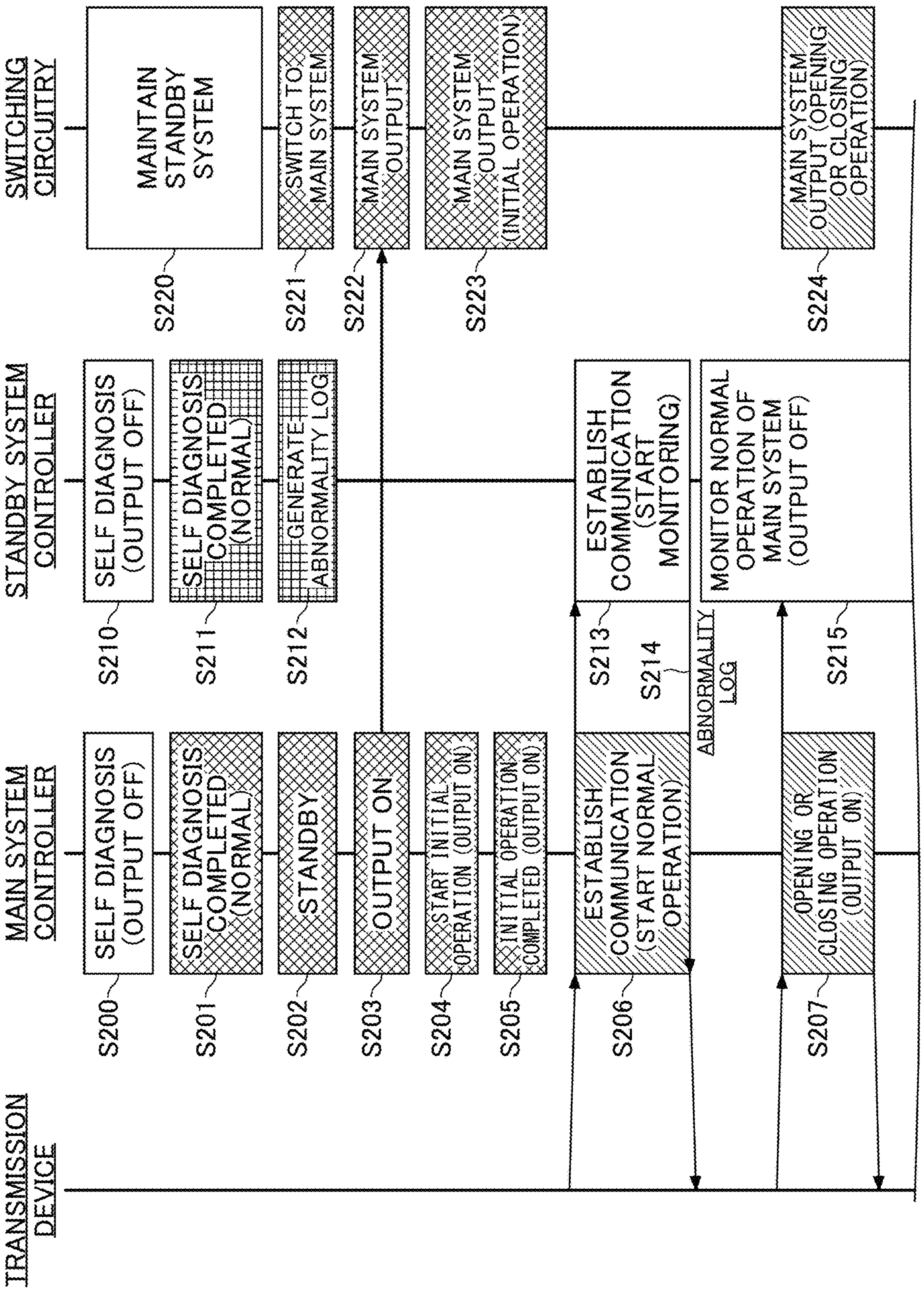
FIG. 6 is a flow chart illustrating a second example of the start sequence process of the door controller when turning on power.
Figure 7:
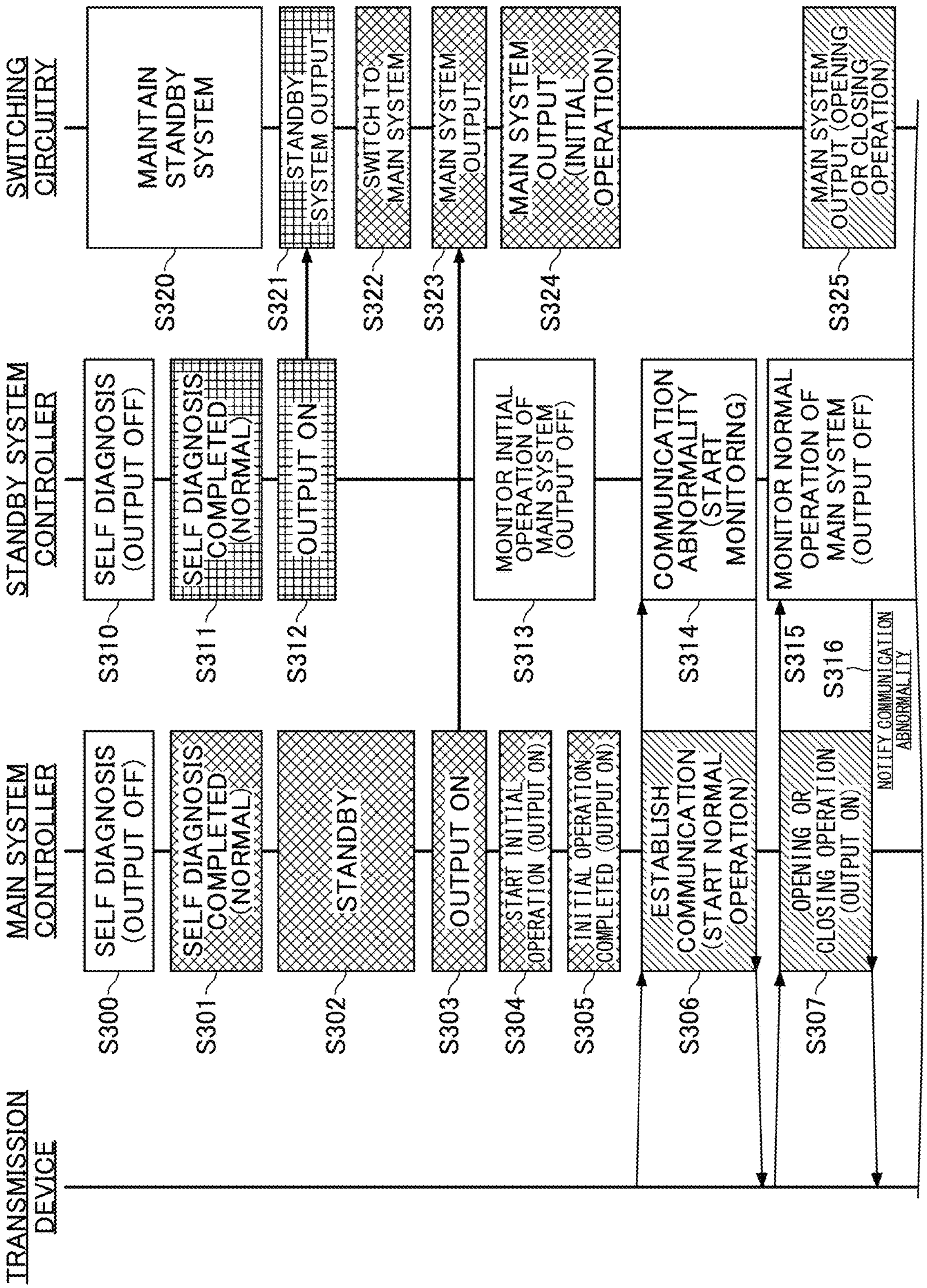
FIG. 7 is a flow chart illustrating a third example of the start sequence process of the door controller when turning on power.

For example, the input signal detecting circuit 113 performs a self diagnosis of the main system controller 110, based on signals input from the input signal detecting circuit 113 (refer to FIG. 5 through FIG. 7). Moreover, the input signal detecting circuit 113 may perform a process corresponding to a result of a self diagnosis process. An input signal detecting circuit 123, which will be described later, may perform the process similar to that performed by the input signal detecting circuit 113.

The sequence controller 114 (an example of a first drive control circuit) performs a sequence control associated with the opening or closing operation of the door 80, based on the signals input from the input signal detecting circuit 113. More particularly, the sequence controller 114 performs the sequence control associated with the opening or closing operation of the door 80, according to the stop signal, the open command, the close command, or the like from the vehicle controller 10. In addition, the sequence controller 114 performs the sequence control associated with the opening or closing operation of the door 80, while determining the open or closed state of the door 80, the position of the door 80 in the opening or closing direction, the locked or released (or unlocked) state of the door 80, or the like, using the signals from the encoder 31, the DCS 60, the DLS 70, or the like.

The motor controller 115 (an example of the first drive control circuit) drives and controls the motor 30 to perform an opening or closing operation of the door 80 corresponding to a control command, according to the control command, related to the opening or closing operation of the door 80, received from the sequence controller 114. The motor controller 115 generates a Pulse Width Modulation (PWM) signal which drives the motor 30, based on a velocity command and a thrust command for the motor 30, for example, which are input from the sequence controller 114, and outputs the PWM signal to the motor drive circuit 116. More particularly, the motor controller 115 may generate the PWM signal which is in conformance with the velocity command and the thrust command, while ascertaining the current, the rotational position of the rotational shaft, or the like of the motor 30, using the detection signals from the encoder 31, the current sensor 32, or the like which are input from the input signal detecting circuit 113.

The motor drive circuit 116 (an example of a first drive circuit) generates and outputs three-phase AC power for driving the motor 30, using the DC power input from the battery 150. The motor drive circuit 116 is configured to include an inverter circuit, for example. In the motor drive circuit 116, two DC power lines at an input side thereof are connected to the battery 150 via the input contactor 151, and three power lines at an output side thereof are connected to the motor 30 via the switching circuitry 130.

The lock or release drive circuit 117 (an example of the first drive circuit) energizes the coils 52 and 53 of the locking device 50 according to a lock command or an release (or unlock) command input from the sequence controller 114, to drive the locking device 50 (pin 51) in the locking direction or the releasing direction of the door 80. A pair of DC power lines including a positive line and a negative line, at an input side of the lock or release drive circuit 117, is connected to the battery 150 via the input contactor 151. Further, one of two pairs of DC power lines, respectively including a positive line and a negative line, at an output side of the lock or release drive circuit 117, is connected to the coil 52 via the switching circuitry 140, while the other of the two pairs of DC power lines at the output side of the lock or release drive circuit 117 is connected to the coil 53 via the switching circuitry 140. For example, the lock or release drive circuit 117 includes a semiconductor switch which can switch between electrically connecting and electrically disconnecting between the pair of DC power lines at the input side, and each of one of the pairs of DC power lines at the output side, and the other of the pairs of DC power lines at the output side thereof, and switches the semiconductor device between on and off states. More particularly, when the lock command is input from the sequence controller 114, the lock or release drive circuit 117 may switch to the state electrically connecting between the pair of DC power lines at the input side and one of the pairs of DC power lines at the output side, and energize the coil 52 of the locking device 50 via the switching circuitry 140. In addition, when the release command is input from the sequence controller 114, the lock or release drive circuit 117 may switch to the state electrically connecting between the pair of DC power lines at the input side and the other of the pairs of DC power lines at the output side, and energize the coil 53 of the locking device 50 via the switching circuitry 140.

The standby system controller 120 (an example of a second controller) is configured to control the opening or closing operation of the door 80, and can perform a backup function of the main system controller 110. Accordingly, because the door controller 100 is provided with the standby system controller 120 in addition to the main system controller 110, redundancy of the control system related to the opening or closing operation of the door 80 can be achieved. More particularly, when an abnormality is generated in the main system controller 110, the standby system controller 120 controls the opening or closing operation of the door 80 in place of the main system controller 110.

The standby system controller 120 includes constituent elements similar to those of the main system controller 110. More particularly, the standby system controller 120 includes a power supply circuit 121, a communication device 122, the input signal detecting circuit 123 (an example of a diagnosis tester), a sequence controller 124 (an example of a second drive control circuit), a motor controller 125 (an example of the second drive control circuit), a motor drive circuit 126 (an example of a second drive circuit), and a lock or release drive circuit 127 (an example of the second drive circuit).

The hardware configuration and functions of the power supply circuit 121, the communication device 122, the input signal detecting circuit 123, the sequence controller 124, the motor controller 125, the motor drive circuit 126, and the lock or release drive circuit 127 of the standby system controller 120 are similar to those of the power supply circuit 111, the communication device 112, the input signal detecting circuit 113, the sequence controller 114, the motor controller 115, the motor drive circuit 116, and the lock or release drive circuit 117 of the main system controller 110, respectively. For this reason, a detailed description of the hardware configuration and functions of the standby system controller 120 will be omitted.

The switching circuitry 130 switches between a state where the motor drive circuit 116 and the motor 30 are electrically connected, and a state where the motor drive circuit 126 and the motor 30 are electrically connected. More particularly, three-phase AC output power lines of the motor drive circuit 116 and the motor drive circuit 126, are connected to the input side of the switching circuitry 130, respectively, and a three-phase AC input power line extending from the motor 30 is connected to the output side of the switching circuitry 130. The switching circuitry 130 switches between a state where the output power line of the motor drive circuit 116 and the input power line of the motor 30 are electrically connected, and a state where the output power line of the motor drive circuit 126 and the input power line of the motor 30 are electrically connected.

The switching circuitry 130 maintains the state where the motor drive circuit 116 and the motor 30 are electrically connected, when the control associated with the opening or closing operation of the door 80 is performed by the main system controller 110. On the other hand, the switching circuitry 130 switches to the state where the motor drive circuit 126 and the motor 30 are electrically connected, when the abnormality is generated in the main system controller 110, and the control associated with the opening or closing operation of the door 80 is performed by the standby system controller 120.

The switching circuitry 140 switches between a state where the lock or release drive circuit 117 and the locking device 50 (coils 52 and 53) are connected, and a state where the lock or release drive circuit 127 and the locking device 50 (coils 52 and 53) are connected. More particularly, two pairs of output power lines of the lock or release drive circuit 117 and the lock or release drive circuit 127, respectively, are connected to an input side of the switching circuitry 140, and two pairs of input power lines extending from the locking device (coils 52 and 53) are connected to an output side of the switching circuitry 140. The switching circuitry 140 switches between a state where the two pairs of output power lines of the lock or release drive circuit 117 and the two pairs of input power lines of the locking device 50 are connected, a state where the two pairs of output power lines of the lock or release drive circuit 127 and the two pairs of input power lines of the lock or release drive circuit 50 are connected.

The switching circuitry 140 maintains the state where the lock or release drive circuit 117 and the locking device 50 (coils 52 and 53) are electrically connected, when the control associated with the opening or closing operation of the door 80 is performed by the main system controller 110. On the other hand, the switching circuitry 140 switches to the state where the lock or release drive circuit 127 is electrically connected to the locking device 50 (coils 52 and 53), when the abnormality is generated in the main system controller 110, and a transition is made to the state where the control associated with the opening or closing operation of the door 80 is performed by the standby system controller 120.

The battery 150 (an example of a power supply) is a condenser mounted in the railway vehicle 1. The battery 150 supplies DC power of a predetermined voltage (for example, 100 volts) to various devices (or components) of the railway vehicle 1, including the motor 30, locking device 50, and the door controller 100.

The input contactor 151 is provided in a power circuit between the battery 150 and the various devices including the door controller 100, to switch the power supply to the railway vehicle 1 between on and off states by opening or closing (that is, turning on or off) the power circuit. The input contactor 151 is closed according to a predetermined operation corresponding to a power on in the driver's cab of the railway vehicle 1, for example. In this case, the power supply to the various devices of the railway vehicle 1, including the door controller 100, is started, to start the railway vehicle 1. In addition, the input contactor 151 is opened according to a predetermined operation corresponding to a power off in the driver's cab of the railway vehicle 1, for example. In this case, the power supply to the various devices of the railway vehicle 1, including the door controller 100, is stopped (cut off), to stop the railway vehicle 1.

The transmission device 160 provides a signal relay function between the door controller 100 of each of the plurality of doors 80 of the railway vehicle 1, and the vehicle controller 10.

The transmission device 160 receives various signals transmitted from the vehicle controller 10 toward the door controller 100, and transmits the various signals (input signal SDR) to each of the door controllers 100. In addition, the transmission device 160 receives various signals (output signal SD) transmitted toward the vehicle controller 100, and transmits the various signals to the vehicle controller 10.

The door drive mechanism 200 transmits power of the motor 30 to the door 80, and causes the door 80 to perform the opening or closing operation. Further, the door drive mechanism 200 also provides a locked state and a released (or unlocked) state of the door 80, according to the operation of the locking device 50 (pin 51).

The door drive mechanism 200 includes racks 210 and 220, and the locking pin 230.

The rack 210 is mounted on a top end of the door 80A. The rack 210 includes a rack portion 211, and a connecting portion 212.

The rack portion 211 is a member that extends in a horizontal direction, more particularly, in a front-back direction of the railway vehicle 1. A rack gear 211A is provided on a lower surface of the rack portion 211. A rotational shaft of the rack portion 211 is arranged above an opening 1A of the railway vehicle 1, at a position slightly above the rotational shaft of the motor 30 arranged in a width direction (left-right direction) of the railway vehicle 1. Hence, a pinion gear, arranged coaxially with the rotational shaft of the motor 30, can engage the rack gear 211A on the lower surface of the rack portion 211. For this reason, it is possible to move the rack portion 211 the front-back direction of the railway vehicle 1, according to the rotation of the motor 30.

The connecting portion 212 connects the door 80A and the rack portion 211. The connecting portion 212 extends upward from the upper end of the door 80A, and the rack portion 211 is connected to an upper end of the connecting portion 212. Accordingly, the door 80A moves in the front-back direction of the railway vehicle 1, linked with a movement of the rack portion 211 according to the rotation of the motor 30, thereby performing the opening or closing operation of the door 80.

The connecting portion 212 includes a DCS abutting portion 212A on the center side of the opening 1A in the front-back direction of the railway vehicle 1. As illustrated in FIG. 2 and FIG. 3, when the door 80A makes a transition to the fully closed state, the DCS abutting portion 212A abuts the movable contact 62 of the DCS 60 and the movable contact 62 presses against the movable contact 62. As a result, the movable contact 62 is pressed inward, thereby turning on the DCS 60. On the other hand, as illustrated in FIG. 4, when the door 80A makes a transition to a state other than the fully closed state, the DCS abutting portion 212A makes a transition to a state not abutting the movable contact 62, thereby turning off the DCS 60.

The rack 220 is mounted on the upper end of the door 80B. The rack 220 includes the rack portion 221, the connecting portion 212, and a locking pin abutting portion 223.

The rack portion 221 is a member that extends in the horizontal direction, more particularly, in the front-back direction of the railway vehicle 1. A rack gear 221A is provided on an upper surface of the rack portion 221. The rack portion 221 is arranged above the opening 1A of the railway vehicle 1, at a position slightly below the rotational shaft of the motor 30. Accordingly, it is possible to engage a pinion gear arranged coaxially with the rotational shaft of the motor 30, with the rack gear 211A on the upper surface of the rack portion 221. For this reason, the rack portion 221 can be moved in the front-back direction of the railway vehicle 1 according to the rotation of the motor 30.

A connecting portion 222 connects the door 80B and the rack portion 221. The connecting portion 222 is provided to extend upward from the upper end of the door 80B, and the rack portion 221 is connected to an upper end of the connecting portion 222. Accordingly, the door 80B moves in the front-back direction of the railway vehicle 1, linked with a movement of the rack portion 221 according to the rotation of the motor 30, thereby performing the opening or closing operation of the door 80. In addition, when the rack gear 211A engages the pinion gear coaxial with the motor 30 from above, and the rack gear 221A engages the pinion gear coaxial with the motor 30 from below, it is possible to move the racks 210 and 220 in opposite directions according to the rotation of the motor 30. For this reason, the opening operation and the closing operation of the two doors 80A and 80B can be performed using a single motor 30.

Moreover, a ramp 222A, which slopes downward toward the center side of the opening 1A in the front-back direction of the railway vehicle 1, is provided on an upper end of the connecting portion 222.

The locking pin abutting portion 223 abuts the locking pin 230 in the locked state of the door 80. With respect to the connecting portion 222, the locking pin abutting portion 223 protrudes in a direction opposite to the direction in which the rack portion 221 extends. The locking pin abutting portion 223 is provided with a locking hole 223A.

The locking hole 223A is a recess provided in an upper surface of the locking pin abutting portion 223. A lower end of the locking pin 230 (a pin portion 231 described below) is inserted into the locking hole 223A when the door 80 is locked.

The locking pin 230 is provided above the locking pin abutting portion 223 of the rack 220. The locking pin 230 includes the pin portion 231, and a locking device abutting portion 232.

The pin portion 231 is provided to extend in the up-down direction.

The locking device abutting portion 232 is mounted on an upper end of the pin portion 231, and is provided to extend horizontally from a connection portion thereof connecting to the pin portion 231, more particularly, in a direction opposite to the opening 1A in the front-back direction of the railway vehicle 1. The locking device 50 is fixedly arranged below the locking device abutting portion 232, and an upper end of the pin 51 of the locking device 50 abuts a lower surface of the locking device abutting portion 232. As a result, the locking device abutting portion 232 is raised in the upward direction, when the pin 51 of the locking device 50 protrudes in the upward direction, and the locking device abutting portion 232 is lowered in the downward direction due to the weight of the locking pin 230 itself, when the pin 51 of the locking device 50 is drawn inward in the downward direction.

As illustrated in FIG. 4, in a state where the pin 51 of the locking device 50 protrudes, the lower end of the pin portion 231, connected to the locking device abutting portion 232, is positioned above the ramp 222A of the rack 220, and the pin portion 231 does not engage the locking hole 223A. For this reason, the door 80 (doors 80A and 80B) is in a state moveable in the opening or closing direction, because the rack 220 is movable without being affected by the arrangement of the locking pin 230.

In contrast, as illustrated in FIG. 2 and FIG. 3, in a state where the pin 51 of the locking device 50 is drawn inward, the lower end of the pin portion 231 is positioned below the ramp 222A of the rack 220. In addition, in the fully closed state of the door 80, the pin portion 231 is positioned on the side of the locking pin abutting portion 223 than the ramp 222A, in the front-back direction of the railway vehicle 1. For this reason, when the pin 51 of the locking device 50 is drawn inward in the fully closed state of the door 80, the locking device abutting portion 232 moves downward, and the pin portion 231 engages the locking hole (or recess) 223A of the rack 220. Hence, the movement of the rack 220 is restricted, and the rotation of the pinion gear engaging the rack gear of the rack 220 is also restricted, thereby restricting the movement of the rack 210 having the rack gear 211A engaging the pinion gear. Accordingly, the movement of the doors 80A and 80B connected to the racks 210 and 220 is restricted, and the locked state of the doors 80A and 80B is realized.

[Start Sequence Process of Door Controller]

Next, a start sequence process (or a process of the start sequence) performed by the door controller 100 when turning on the power, that is, when the input contactor 151 makes a transition from the open state to the closed state, will be described with reference to FIG. 5 through FIG. 7.

First Example of Start Sequence Process

FIG. 5 is a flow chart illustrating a first example of the start sequence process of the door controller 100 when turning on the power. More particularly, FIG. 5 is a flow chart illustrating a specific example of the start sequence process when both the main system controller 110 and the standby system controller are normal.

The power supply to the various devices of the railway vehicle 1 is started, according to the transition of the input contactor 151 from the open state to the closed state. Accordingly, the power supply to the transmission device 160 is also started with the turning on of the power (or power-on) of the door controller 100, and the switching circuitry 130, the switching circuitry 140, the transmission device 160, or the like are also started. In addition, the switching operation of the switching circuitry 130 and the switching circuitry 140 may be implemented by a command of an internal controller thereof, or may be implemented by a command from an external device, such as the main system controller 110 or the standby system controller 120, or the like, for example.

When the power supply to the door controller 100 is started, the door controller 100 is started, and begins a start sequence process. Hereinafter, the same applies to flow charts illustrated in FIG. 6 and FIG. 7 which will be described later.

As illustrated in FIG. 5, the main system controller 110 and the standby system controller 120 perform a self diagnosis process immediately after the power is turned on (step S100 and step S110). In this state, the main system controller 110 and the standby system controller 120 do not output the driving power from the motor drive circuit 116 and the lock or release drive circuit 117, and the driving power from the motor drive circuit 126 and the lock or release drive circuit 127, to the motor 30 and the locking device 50, respectively.

The self diagnosis process refers to a process in which each of the main system controller 110 and the standby system controller 120 performs a diagnosis thereof related to an abnormality, and the self diagnosis process may be arbitrarily performed by utilizing a known diagnosing method. The diagnosis related to the abnormality includes diagnosing the presence or absence of the abnormality, diagnosing the extent of the abnormality in the presence of the abnormality, diagnosing specific contents of the abnormality, or the like.

In the self diagnosis process, a diagnosis related to an abnormality in the functions related to the opening or closing operation and a locking operation of the door 80, among the various functions of the main system controller 110 and the standby system controller 120, is performed. More particularly, the main system controller 110 may be configured to mainly perform a diagnosis related to control functions associated with the opening or closing operation and the locking operation of the door 80, as the self diagnosis process, for example, and to separately perform a diagnosis related to the abnormality in the functions of the motor drive circuit 116, the lock or release drive circuit 117, the communication device 112, of the like. Similarly, the standby system controller 120 may be configured to mainly perform a diagnosis related to the control functions associated with the opening or closing operation and the locking operation of the door 80, as the self diagnosis process, for example, and to separately perform a diagnosis related to the abnormality in the functions of the motor drive circuit 126, the lock or release drive circuit 127, the communication device 122, of the like.

In addition, the switching circuitries 130 and 140 respectively maintain a state where the standby system controller 120 and an output target (motor 30 and locking device 50) are electrically connected, after turning on the power (step S120).

More particularly, the door controller 100 may unconditionally connect the switching circuitries 130 and 140 with the standby system controller 120, as a termination process, when turning off the power, that is, when the input contactor 151 makes a transition from the closed state to the open state. Accordingly, every time the power is turned on, the switching circuitries 130 and 140 can start in the state where the standby system controller 120 and the output target are electrically connected, and maintain this state. Hereinafter, the same may apply to the start sequence processes of the flow charts illustrated in FIG. 6 and FIG. 7.

The standby system controller 120 outputs a predetermined driving power from the motor drive circuit 126 and the lock or release drive circuit 127 with respect to the motor 30 and the locking device 50, respectively, when the self diagnosis process ends and the diagnosis result is "normal" (step S111 and step S112).

The switching circuitries 130 and 140 output the driving power output from the standby system controller 120 in step S112, to the motor 30 and the locking device 50, respectively (step S121).

Thus, the door controller 100 can check whether or not the driving power is normally supplied through the switching circuitries 130 and 140, using the signals from the encoder 31, the current sensor 32, the DCS 60, the DLS 70, or the like detected by the input signal detecting circuits 113 and 123. For this reason, the door controller 100 can perform a diagnosis related to the abnormality in the electrical connection state provided by the switching circuitries 130 and 140 between the standby system controller 120 and the output target, together with the self diagnosis of the main system controller 110 and the standby system controller 120 when the power is turned on. For example, the door controller 100 can cause the motor 30 to generate a relatively small thrust in the closing direction of the door 80 when the close command is received and the door 80 is in the fully closed state, and check the operation of the encoder 31, DCS 60, or the like. Similarly, for example, the door controller 100 can cause the motor 30 to generate a relatively small thrust in the opening direction of the door 80 when the open command is received and the door 80 is in the fully open state, and check the operation of the encoder 31, DCS 60, or the like. Further, for example, the door controller 100 can cause the driving power in the locking direction to be supplied to the locking device 50 when the close command is received and the door 80 is in the locked state, and check the operation of the DLS 70 or the like. Similarly, for example, the door controller 100 can cause the driving power in the releasing direction to be supplied to the locking device 50 when the open command is received and the door 80 is in the released state, and check the operation of the DLS 70 or the like. Hereinafter, the same may be applied to the process of step S123.

When the output of the driving power from the standby system controller 120 is completed, the switching circuitries 130 and 140 switch to the state where the main system controller 110 and the output target are connected (step S122).

After completion of step S112, the standby system controller 120 may perform (start) an initial operation similar to that in the case of the main system controller 110 (step S104) which will be described later. In this case, similar to the initial operation in the case of the main system controller 110 (step S124) which will be described later, the switching circuitries 130 and 140 output the driving power supplied according to the initial operation of the standby system controller 120 to the motor 30 and the locking device 50, between step S121 and step S122, respectively. When the initial operation of the standby system controller 120 is started, the main system controller 110 may monitor the initial operation of the standby system controller 120, and the operation of the corresponding switching circuitries 130 and 140, using the various signals detected by the input signal detecting circuit 113.

On the other hand, when the self diagnosis process is completed and the diagnosis result is "normal", the main system controller 110 waits until the switching circuitries 130 and 140 switch to the state connecting the main system controller 110 and the output target (steps 101 and S102).

Then, when the switching circuitries 130 and 140 switch to the state connecting the main system controller 110 and the output target, the main system controller 110 outputs the predetermined driving power from the motor drive circuit 116 and the lock or release drive circuit 117 to the motor 30 and the locking device 50, respectively (step S103).

Depending on a timing when the self diagnosis process of the main system controller 110 ends, the switching circuitries 130 and 140 may already be switched to the state connecting the main system controller 110 and the output target. In this case, the main system controller 110 may omit the waiting process of step S102, and immediately perform the process of step S103 to output the predetermined driving power from the motor drive circuit 116 and the lock or release drive circuit 117 to the motor 30 and the locking device 50, respectively. Hereinafter, the same may be applied to the process of step S202 illustrated in FIG. 6, and to the process of step S302 illustrated in FIG. 7, which will be described later.

The switching circuitries 130 and 140 output the driving power output from the main system controller 110 in step S103 to the motor 30 and the locking device 50, respectively (step S123).

Accordingly, the door controller 100 can check whether or not the driving power is normally supplied through the switching circuitries 130 and 140, using the signals from the encoder 31, the current sensor 32, the DCS 60, and the DLS 70, or the like detected by the input signal detecting circuits 113 and 123. In other words, the door controller 100 can check the operations of the motor drive circuits 116 and 126, and the lock or release drive circuits 117 and 127, and check the operations of the switching circuitries 130 and 140. For this reason, the door controller 100 can perform the diagnosis related to the abnormality associated with the various drive circuits, and the abnormality associated with the electrical connection state between the main system controllers 110 and the output target provided by the switching circuitries 130 and 140, together with the self diagnosis of the various controllers including the main system controller 110 and the standby system controller 120 when the power is turned on. The door controller 100 can perform the diagnosis related to the abnormality in the switching by the switching circuitries 130 and 140 from the state where the standby system controller 120 is connected to the output target, to the state where the main system controller 110 is connected to the output target. Hereinafter, the same may be applied to the processes of steps S221 and S222 illustrated in FIG. 6, and the processes of steps S321 through S323 illustrated in FIG. 7, which will be described later.

The process of step S121 corresponding to step S112 and step S112, and the process of step S123 corresponding to step S103 and step S103 may be omitted. Hereinafter, the same may be applied to the process of step S321 corresponding to step S312 and step S312, and the process of step S323 corresponding to step S303 and step S303 of a third example illustrated in FIG. 7 which will be described later. In this case, the main system controller 110 and the standby system controller 120 may transmit a notification signal indicating the result of the self diagnosis to the switching circuitries 130 and 140, respectively, when the self diagnosis thereof is completed. In addition, the switching circuitries 130 and 140 may perform the process of step S122, when the notification signal of the self diagnosis result is received from both the main system controller 110 and the standby system controller 120, and the main system controller 110 is normal. Accordingly, the door controller 100 can simply perform an operation check of the switching operation of the switching circuitries 130 and 140, even though the door controller 100 cannot check the operations of the motor drive circuits 116 and 126 and the lock or release drive circuits 117 and 127.

After outputting the predetermined driving power in step S103, the main system controller 110 starts a predetermined initial operation (step S104). In this state, the main system controller 110 outputs the predetermined driving power corresponding to the initial operation, from the motor drive circuit 116 and the lock or release drive circuit 117 to the motor 30 and the locking device 50, respectively. Hereinafter, the same may be applied to the process of step S204 illustrated in FIG. 6, and the process of step S304 illustrated in FIG. 7, which will be described later.

The switching circuitries 130 and 140 output the driving power supplied according to the initial operation of the main system controller 110 started in step S104, to the motor 30 and the locking device 50, respectively (step S124).

On the other hand, when the initial operation of the main system controller 110 is started, the standby system controller 120 monitors the initial operation of the main system controller 110 and the operation of the corresponding switching circuitries 130 and 140, using the various signals detected by the input signal detecting circuit 123 (step S113). In this state, the standby system controller 120 naturally does not output the driving power from the motor drive circuit 126 and the lock or release drive circuit 127 to the motor 30 and the locking device 50, respectively.

When the initial operation of the main system controller 110 is completed, the main system controller 110 returns the output signal SD according to the input signal SDR from the transmission device 160, and establishes a communication connection (or communication link) between the transmission device 160 and the vehicle controller 10 (step S105 and step S106). Then, the main system controller 110 starts the normal operation. The normal operation refers to the opening or closing operation of the door 80 according to a service status of the railway vehicle 1.

Similarly, when the initial operation of the main system controller 110 is completed, the standby system controller 120 returns the output signal SD according to the input signal SDR from the transmission device 160, and establishes a communication connection between the transmission device 160 and the vehicle controller 10 (step S114). Then, the standby system controller 120 starts monitoring the normal operation of the main system controller 110, using the various signals detected by the input signal detecting circuit 123.

In this first example illustrated in FIG. 5 the standby system controller 120 (communication device 122) communicates with the transmission device 160 and the vehicle controller 10 through the main system controller 110 (communication device 112). However, the standby system controller 120 may communicate directly with the transmission device 160 and the vehicle controller 10. Hereinafter, the same may be applied to the second example illustrated in FIG. 6, and the third example illustrated in FIG. 7.

When the open command or the close command for the door 80 is input from the transmission device 160 after the normal operation starts, the main system controller 110 outputs the driving power from the motor drive circuit 116 and the lock or release drive circuit 117, and performs the opening or closing operation of the door 80 including the locking or releasing of the door 80 (step S107).

Then, the switching circuitries 130 and 140 output the driving power output in step S107 to the motor 30 and the locking device 50, to perform the opening or closing operation of the door 80 (step S125).

As described above, when the communication connection between the transmission device 160 and the vehicle controller 10 is established, the standby system controller 120 monitors the normal operation of the main system controller 110 (step S115). The standby system controller 120 can recognize (or estimate) the operation required of the motor 30 or the locking device 50, by recognizing the open command or the close command received from the transmission device 160, and monitor the normal operation of the main system controller 110 by comparing the recognized operation with the actual operation. In this state, the standby system controller 120 naturally does not output the driving power from the motor drive circuit 126 and the lock or release drive circuit 127 to the motor 30 and the locking device 50, respectively.

As described above, in this first example, the door controller 100 (the input signal detecting circuit 123 of the standby system controller 120) performs the diagnosis related to the abnormality in the standby system controller 120 when the power is turned on.

Hence, the door controller 100 can check whether or not the standby system controller 120 is normal, for example, before starting the service of the railway vehicle 1. For this reason, even if the abnormality is generated in the main system controller 110 during the service of the railway vehicle 1, for example, the door controller 100 can safely transfer control related to the opening or closing operation of the door 80 to the standby system controller 120 which has been checked to be in the normal state. As a result, the door controller 100 can more appropriately operate the redundant control system for the door of the railway vehicle 1.

Moreover, in this first example, when the power of the door controller 100 is turned on, the switching circuitry 130 switches between the state capable of supplying the driving power from the motor drive circuit 116 to the motor 30, and the state where the driving power from the motor drive circuit 126 is supplied to the motor 30, according to the output of the driving power from each of the motor drive circuit 116 and the motor drive circuit 126.

Similarly, when the power of the door controller 100 is turned on, the switching circuitry 140 switches between the state capable of supplying the driving power from the lock or release drive circuit 117 to the locking device 50, and the state capable of supplying the driving power from the lock or release drive circuit 127 to the locking device 50.

Accordingly, when the power of the door controller 100 is turned on, the door controller 100 can check whether or not the functions of the switching circuitries 130 and 140 are normal, according to the self diagnosis process of the main system controller 110 and the standby system controller 120. For this reason, even if the abnormality is generated in the main system controller 110 during the service of the railway vehicle 1, for example, the door controller 100 can positively cause the standby system controller 120 to take over the control related to the opening or closing operation of the door 80 from the main system controller 110, using the functions of the switching circuitries 130 and 140 which have been checked of the normal states thereof.

Moreover, in this first example, the input signal detecting circuit 123 performs the diagnosis related to abnormality in the motor controller 125 when the power of the door controller 100 is turned on. The motor controller 125 outputs the driving power from the motor drive circuit 126 to the motor 30 when the diagnosis related to the abnormality in the motor controller 125 is completed. When the power of the door controller 100 is turned on, the switching circuitry 130 is in the state capable of supplying the driving power from the motor drive circuit 126 to the motor 30, and after the driving power is output from the motor drive circuit 126, the state is switched to the state capable of supplying the driving power from the motor drive circuit 116 to the motor 30.

Similarly, the input signal detecting circuit 123 performs the diagnosis related to the abnormality in the sequence controller 124 when the power of the door controller 100 is turned on. The sequence controller 124 outputs the driving power from the lock or release drive circuit 127 to the locking device 50 when the diagnosis related to the abnormality in the sequence controller 124 is completed. When the power of the door controller 100 is turned on, the switching circuitry 140 is in the state capable of supplying the driving power from the lock or release drive circuit 127 to the locking device 50, and after the driving power is output from the lock or release drive circuit 127, the state is switched to the state capable of supplying the driving power from the lock or release drive circuit 117 to the locking device 50.

For example, when first diagnosing the abnormality in the output of the driving power from the main system controller 110 to the motor 30 or the locking device 50, the switching circuitries 130 and 140 requires the switching to be performed twice. This is because the switching circuitries 130 and 140 require the switching for the diagnosis related to the abnormality in the output of the driving power from the standby system controller 120 to the motor 30 or the locking device 50, and then the switching for the normal control related to the operation of the door 80 by the main system controller 110. On the other hand, in this first example, the door controller 100 can realize the state capable of supplying the driving power from the main system controller 110 to the motor 30 or the locking device 50, requiring the switching of the switching circuitries 130 and 140 only once, by first performing the diagnosis related to the abnormality in the output of the driving power from the standby system controller 120 to the motor 30 or the locking device 50. For this reason, the door controller 100 can relatively shorten the time required for the start sequence process, and relatively accelerate a start timing of the normal operation.

In addition, in this first example, the input signal detecting circuits 113 and 123 perform the diagnosis related to the abnormality in the motor controllers 115 and 125, respectively, when the power of the door controller 100 is turned on. Further, when the power of the door controller 100 is turned on, the switching circuitry 130 is in the state capable of supplying the driving power from the motor drive circuit 126 to the motor 30, and the state is switched to the state capable of supplying the driving power from the motor drive circuit 116 to the motor 30 when the diagnosis result of the motor controller 115 is normal.

Similarly, in this first example, the input signal detecting circuits 113 and 123 perform the diagnosis related to the abnormality in the sequence controllers 114 and 124, respectively, when the power of the door controller 100 is turned on. Moreover, when the power of the door controller 100 is turned on, the switching circuitry 140 is in the state capable of supplying the driving power from the lock or release drive circuit 127 to the locking device 50 to the locking device 50, and the state is switched to the state capable of supplying the driving power from the lock or release drive circuit 117 to the locking device 50 when the diagnosis result of the sequence controller 114 is normal.

Accordingly, similar to the case described above, the door controller 100 can realize the state capable of supplying the driving power from the main system controller 110 to the motor 30 or the locking device 50, requiring the switching of the switching circuitries 130 and 140 only once. For this reason, the door controller 100 can relatively shorten the time required for the start sequence process, and relatively accelerate the start timing of the normal operation. In addition, it is possible to simply perform the operation check of the switching circuitries 130 and 140, and omit the operation check of the motor drive circuits 116 and 126 and the operation check of the lock or release drive circuits 117 and 127. Thus, the door controller 100 can further reduce the time required for the start sequence process, and further accelerate the start timing of the normal operation.

Of course, other requirements or the like may be prioritized, for example, to first perform the diagnosis related to the abnormality in the output of the driving power from the main system controller 110 to the motor 30 or the locking device 50.

In this first example, the input signal detecting circuit 123 performs the diagnosis related to the abnormality in the communication device 122, after the diagnosis related to the abnormality in the motor drive circuit 126 and the motor controller 125 is completed.

Similarly, in this first example, the input signal detecting circuit 123 performs the diagnosis related to the abnormality in the communication device 122, after the diagnosis related to the abnormality in the lock or release drive circuit 127 and the sequence controller 124 is completed.

Accordingly, the door controller 100 can defer the diagnosis related to the abnormality in the communication device 122, different from the function of the standby system controller 120 which outputs the driving power to the motor 30 and the locking device 50, and output the predetermined driving power from the standby system controller 120. For this reason, the door controller 100 can switch the switching circuitries 130 and 140 from the state where the standby system controller 120 and the output target are connected, to the state where the main system controller 110 and the output target are connected, at a relatively accelerated timing. Hence, the door controller 100 can relatively shorten the time required for the start sequence process, and relatively accelerate the start timing of the normal operation.

Of course, the diagnosis related to the abnormality in the communication device 122 may be prioritized, for example, and the diagnosis related to the abnormality in the communication device 122 may first be performed together with the function of the standby system controller 120 which outputs the driving power to the motor 30 and the locking device 50.

Further, in this first example, when the power of the door controller 100 is turned off, and the door controller 100 is in the state capable of supplying the driving power from the motor drive circuit 116 to the motor 30, the switching circuitry 130 switches to the state capable of supplying the driving power from the motor drive circuit 126 to the motor 30.

Similarly, in this first example, when the power of the door controller 100 is turned off, and the door controller 100 is in the state capable of supplying the driving power from the lock or release drive circuit 117 to the locking device 50, the switching circuitry 140 switches to the state capable of supplying the driving power from the lock or release drive circuit 127 to the locking device 50.

Accordingly, when the power of the door controller 100 is turned on, the door controller 100 does not need to check the state of the switching circuitries 130 and 140. For this reason, the door controller 100 can relatively shorten the time required for the start sequence process, and relatively accelerate the start timing of the normal operation.

Of course, other requirements may be prioritized, for example, and if the door controller 100 is in the state capable of supplying the driving power from the motor drive circuit 116 to the motor 30 when the power of the door controller 100 is turned on, the state may be switched to the state capable of supplying the driving power from the motor drive circuit 126 to the motor 30.

Second Example of Start Sequence Process

FIG. 6 is a flow chart illustrating a second example of the start sequence process performed by the door controller 100 when turning on the power. More particularly, FIG. 6 is a diagram illustrating a specific example of the start sequence process when the abnormality is generated in the function of the standby system controller 120 which outputs the driving power to the motor 30 or the locking device 50.

As illustrated in FIG. 6, the main system controller 110 and the standby system controller 120 perform the self diagnosis process immediately after the power is turned on (step S200 and step S210), similar to the first example described above in conjunction with FIG. 5.

The switching circuitries 130 and 140 maintain the electrically connected state between the standby system controller 120 and the output target (the motor 30 and the locking device 50) after the power is turned on (step S220), similar to the first example described above in conjunction with FIG. 5.

When the self diagnosis process of the standby system controller 120 ends and the diagnosis result indicating "abnormality" is obtained, the standby system controller 120 generates log data (hereinafter, also referred to as "abnormality log") indicating that the diagnosis result indicates the abnormality, and stores the abnormality log in an internal memory, such as a memory device or the like (step S211 and step S212).

When the self diagnosis process of the standby system controller 120 is completed and the diagnosis result indicating the abnormality is obtained, the switching circuitries 130 and 140 switch to the state where the main system controller 110 and the output target are connected, when the output of the driving power from the standby system controller 120 is completed.

This is because, the result of the self diagnosis process of the standby system controller 120 indicates "abnormal", and the driving power is not output from the standby system controller 120 toward the output target, similar to the first example described above in conjunction with FIG. 5.

On the other hand, when the self diagnosis process of the main system controller 110 ends and the diagnosis result indicating "normal" is obtained, the main system controller 110 waits until the switching circuitries 130 and 140 switch to the state where the main system controller 110 is connected to the output target (step S201 and step S202).

Then, when the switching circuitries 130 and 140 switch to the state where the main system controller 110 is connected to the output target, the main system controller 110 outputs the predetermined driving power from the motor drive circuit 116 and the lock or release drive circuit 117 to the motor 30 and the locking device 50 (step S203).

The switching circuitries 130 and 140 output the driving power output from the main system controller 110 in step S203 to the motor 30 and the locking device 50, respectively (step S222).

After outputting the predetermined driving power in step S203, the main system controller 110 starts the predetermined initial operation (step S204).

The switching circuitries 130 and 140 output the driving power supplied according to the initial operation of the main system controller 110 started in step S204, to the motor 30 and the locking device 50, respectively (step S223).

Similar to the first example described above in conjunction with FIG. 5, the process of step S223 corresponding to step S203 and step S203 may be omitted. In this case, the main system controller 110 and the standby system controller 120 may, when the self diagnosis thereof is completed, transmit the notification signal indicating the self diagnosis result to the switching circuitries 130 and 140, respectively, as described above. The switching circuitries 130 and 140 may perform the process of step S222 when the notification signal indicating the self diagnosis result is received from both the main system controller 110 and the standby system controller 120, and the main system controller 110 is normal.

When the initial operation is completed, the main system controller 110 returns the output signal SD according to the input signal SDR from the transmission device 160, and establishes the communication connection between the transmission device 160 and the vehicle controller 10 (step S205 and step S206). Then, the main system controller 110 starts the normal operation.

Similarly, when the initial operation of the main system controller 110 is completed, the standby system controller 120 returns the output signal SD according to the input signal SDR from the transmission device 160, and establishes the communication connection between the transmission device 160 and the vehicle controller 10 (step S213). Then, the standby system controller 120 starts monitoring the normal operation of the main system controller 110, using the various signals detected by the input signal detecting circuit 123.

When the communication connection between the transmission device 160 and the vehicle controller 10 is established, the standby system controller 120 transmits the abnormality log stored in the internal memory to the vehicle controller 10, through the transmission device 160 (step S214).

Accordingly, the vehicle controller 10 can recognize the abnormality generated in the standby system controller 120 before providing the service of the train including the railway vehicle 1. For this reason, the vehicle controller 10 can notify the train crew that there is an abnormality in the functions of driving and controlling the motor 30 and the locking device 50 of the standby system controller 120, through a predetermined output device in the driver's cab. The predetermined output devices include illumination devices, such as warning lamps or the like, display devices, such as liquid crystal displays or the like, and sound output devices, such as speakers, buzzers or the like, for example. As a result, the train crew of the railway vehicle 1 can replace the railway vehicle 1 in which the abnormality is generated in the standby system controller 120 with another railway vehicle before providing the service of the train including the railway vehicle 1, for example, and provide the service of the train using the replaced railway vehicle. Therefore, even if the abnormality is generated in the main system controller 110 of the railway vehicle 1 while the train is in service, for example, it is possible to avoid a situation where the control function associated with the door 80 cannot be switched to the standby system controller 120 and the target door 80 becomes unusable.

Instead of or in addition to transmitting the abnormality log, the door controller 100 may stop (or prohibit) the operation of the door 80, and transmit a signal notifying the stopped (or prohibited) operation of the door 80 to the vehicle controller 10 through the transmission device 160. In this case, the main system controller 110 (for example, the input signal detecting circuit 113 (an example of the operation stopping circuit)) may transmit a signal prohibiting operation of the door 80 to the sequence controller 114 and the motor controller 115 when the abnormality in the standby system controller 120 is recognized through internal communication. Accordingly, the main system controller 110 may maintain the door 80 in the closed state and abort the operation of the door 80, even if the open command or the close command for the door 80 is input. In addition, the vehicle controller 10 can recognize the aborted operation state of the door 80 of the railway vehicle 1, from the signal received from the door controller 100 and prohibiting the operation of the door 80, before providing the service of the train including the railway vehicle 1. For this reason, the vehicle controller 10 can notify the aborted operation state the door 80 of the railway vehicle 1 to the train crew. As a result, the train crew of the railway vehicle 1 can replace the railway vehicle 1 in which the abnormality is generated in the main system controller 110 with another railway vehicle before providing the service of the train including the railway vehicle 1, for example, and provide the service of the train using the replaced railway vehicle. Therefore, the door controller 100 can substantially force the replacement of the railway vehicle 1 in which the abnormality is generated in the main control system 110 thereof and the control functions associated with the opening or closing of the door 80 would not be switchable to the standby control system 120 during the service of the train, with another railway vehicle. Hereinafter, the same may be applied to a third example which will be described later in conjunction with FIG. 7.

When the open command or the close command for the door 80 is input from the transmission device 160 after normal operation starts, the main system controller 110 outputs the driving power from the motor drive circuit 116 and the lock or release drive circuit 117, and performs the control causing the opening or closing operation of the door 80, including the locking or releasing operation of the door 80 (step S207).

The switching circuitries 130 and 140 output the driving power output in step S107 to the motor 30 and the locking device 50, to perform the opening or closing operation of the door 80 (step S224).

As described above, when the communication connection between the transmission device 160 and the vehicle controller 10 is established, the standby system controller 120 monitors the normal operation of the main system controller 110 (step S215).

As described above, in this second example, the door controller 100 (the input signal detecting circuit 123 of the standby system controller 120) performs the diagnosis related to the abnormality in the standby system controller 120 when the power is turned on, similar to the first example described above.

Hence, the door controller 100 can check whether or not the abnormality is generated in the standby system controller 120, before starting the service of the railway vehicle 1. For this reason, the door controller 100 can urge replacement of the railway vehicle 1 with another railway vehicle, by aborting the operation of the door 80, or by notifying the abnormality in the standby system control 120 to the train crew through the vehicle controller 10, for example. As a result, it is possible to reduce a situation where the abnormality is generated in the main system controller 110 during the service of the railway vehicle 1, and the control functions associated with the opening or closing operation of the door 80 cannot be transferred to the standby system controller 120 also including the abnormality, which situation would greatly affect the service of the train including the railway vehicle 1. Accordingly, the door controller 100 can more appropriately operate the redundant control system for the door 80 of the railway vehicle 1.

In this second example, when the input signal detecting circuit 113 diagnoses that the abnormality is generated in the standby system controller 120, the input signal detecting circuit 123 stops the operation of the door 80.

Thus, the door controller 100 can substantially force the replacement of the railway vehicle 1 in which the control functions associated with the opening or closing of the door 80 cannot be switched to the standby control system 120, with another railway vehicle, with respect to a person in charge of the train operation or the train crew of the train, for example. As a result, the door controller 100 can more appropriately reduce the situation where the operation of the train would become greatly affected.

Third Example of Start Sequence Process

FIG. 7 is a flow chart illustrating a third example of the start sequence process performed by the door controller 100 when the power is turned on. More particularly, FIG. 7 is a diagram illustrating a specific example of the start sequence process when the abnormality is generated in the communication device 122 of the standby system controller 120.

As illustrated in FIG. 7, steps S300 through S306 of the main system controller 110 are the same as steps S100 through S106 illustrated in FIG. 5, and a description thereof will be omitted. In addition, because steps S310 through S313 of the standby system controller 120 are the same as steps S110 through S113 illustrated in FIG. 5, a description thereof will be omitted. Further, because steps S320 through S324 of the switching circuitries 130 and 140 are the same as steps S120 through S124 illustrated in FIG. 5, a description thereof will be omitted.

When the initial operation of the main system controller 110 is completed (step S305), the standby system controller 120 returns the output signal SD according to the input signal SDR from the transmission device 160, and attempts to establish the communication connection between the transmission device 160 and the vehicle controller 10. However, in this third example, the standby system controller 120 fails to establish the communication connection between the transmission device 160 and the vehicle controller 10 through the communication device 122 for some reason, and determines the presence of a communication abnormality (step S314). Then, the standby system controller 120 starts monitoring the normal operation of the main system controller 110, using the various signals detected by the input signal detecting circuit 123.

In addition, similar to the first example described above in conjunction with FIG. 5, the switching circuitries 130 and 140 maintain the electrically connected state between the standby system control system 120 and the output target (motor 30 and the locking device 50) after power is turned on (step S320).

When the open command or the close command for the door 80 is input from the transmission device 160 after the normal operation starts, the main system controller 110 outputs the driving power from the motor drive circuit 116 and the lock or release drive circuit 117, and performs the control causing the opening or closing operation of the door 80, including the locking or releasing of the door 80 (step S307).

Then, the switching circuitries 130 and 140 output the driving power output in step S107 to the motor 30 and the locking device 50, to perform the opening or closing operation of the door 80 (step S325).

As described above, when establishing the communication connection between the transmission device 160 and the vehicle controller 10 fails, the standby system controller 120 monitors the normal operation of the main system controller 110 (step S315).

The standby system controller 120 transmits a notification of the communication abnormality to the vehicle controller 10 through the transmission device 160, according to the timing when the open command or the close command of the vehicle controller 10 is received through the transmission device 160 (step S316).

Accordingly, similar to the second example described above in conjunction with FIG. 6, the vehicle controller 10 can recognize the abnormality generated in the standby system controller 120 before the service of the train including the railway vehicle 1 is started. For this reason, the vehicle controller 10 can notify the train crew that the abnormality is generated in the functions of driving and controlling the motor 30 and the locking device 50 of the standby system controller 120, through the predetermined output device in the driver's cab. As a result, the train crew of the railway vehicle 1 can replace the railway vehicle 1 in which the abnormality is generated in the standby system control 120, with another railway vehicle before starting the service of the train including the railway vehicle 1, and start the service of the train including the replaced railway vehicle. Therefore, it is possible to avoid a situation where the abnormality is generated in the main system controller 110 of the railway vehicle 1 during the service of the train including the railway vehicle 1, for example, but the control function associated with the opening or closing operation of the door 80 cannot be switched to the standby system controller 120, and the target door 80 becomes unusable.

As described above, in this third example, the door controller 100 (the input signal detecting circuit 123 of the standby system controller 120) performs the diagnosis related to the abnormality in the standby system controller 120 when the power is turned on, similar to the first and second examples described above.

Accordingly, the door controller 100 can check whether or not the abnormality is generated in the standby system controller 120, before starting the service of the railway vehicle 1, similar to second example described above. For this reason, the door controller 100 can urge replacement of the railway vehicle 1 with another railway vehicle, by aborting the operation of the door 80, or by notifying the abnormality in the standby system control 120 to the train crew through the vehicle controller 10, for example. As a result, it is possible to reduce a situation where the abnormality is generated in the main system controller 110 during the service of the railway vehicle 1, and the control functions associated with the opening or closing operation of the door 80 cannot be transferred to the standby system controller 120 also including the abnormality, which situation would greatly affect the service of the train including the railway vehicle 1. Accordingly, the door controller 100 can more appropriately operate the redundant control system for the door 80 of the railway vehicle 1.

[Switching Method of Switching Circuitry]

Next, a switching method of the switching circuitries 130 and 140 which switch a connection source connected to the output target (the motor 30 or the locking device 50) between two connection candidates (the main system controller 110 and the standby system controller 120) will be described, with reference to FIG. 8 through FIG. 11.

<Summary>

In the start sequence process, the switching circuitries 130 and 140 switch the connection source of the switching circuitries 130 and 140 according to the following conditions (1) to (5).

(1) The switching circuitries 130 and 140 are in the state where the standby system controller 120 and the output target (the motor 30 or the locking device 50) are connected, when the power of the door controller 100 is turned on.

(2) The switching circuitries 130 and 140 switch to the state where the main system controller 110 and the output target are connected, when the self diagnosis process of the main system controller 110 and the standby system controller 120 is completed, and the diagnosis result "normal" for both the main system controller 110 and the standby system controller 120.

(3) The switching circuitries 130 and 140 maintain the state where the standby system controller 120 and the output target are connected, when the self diagnosis process of the main system controller 110 and the standby system controller 120 is completed, and the abnormality is generated only in the main system controller 110.

(4) The switching circuitries 130 and 140 switch to the state where the main system controller 110 and the output target are connected, when the self diagnosis process of the main system controller 110 and the standby system controller 120 is completed, and the abnormality is generated only in the standby system controller 120.

(5) The switching circuitries 130 and 140 wait without switching to the state where the main system controller 110 and the output target are connected, until the self diagnosis process of the standby system controller 120 is completed, when the self diagnosis process of the main system controller 110 is completed before the self diagnosis process of the standby system controller 120, and the diagnosis result of the main system controller 110 is "normal".

The condition (1) corresponds to the precondition of the switching circuitries 130 and 140, and the switching of the switching circuitries 130 and 140 is performed when any one of the conditions (2) through (4) is satisfied.

In addition, the condition (5) corresponds to the precondition when the condition (2) or (4) is satisfied.

When the condition (3) is satisfied, the standby system controller 120 may perform processes similar to the processes of the main system controller 110 illustrated in FIG. 5 through FIG. 7, for example.

<Example of Switching Method of Switching Circuitry>

Figure 8:
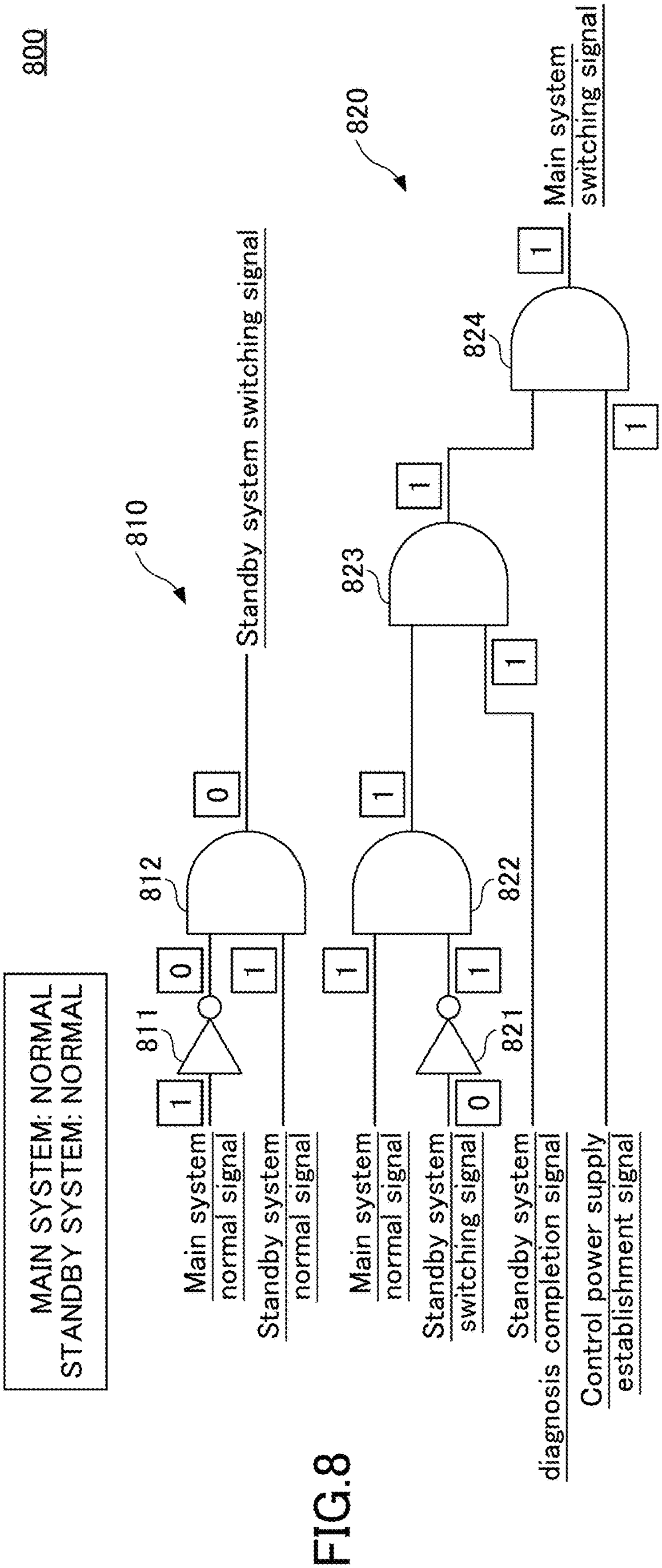
FIG. 8 is a diagram illustrating a logic circuit corresponding to an example of a switching method for a switching circuitry.
Figure 9:
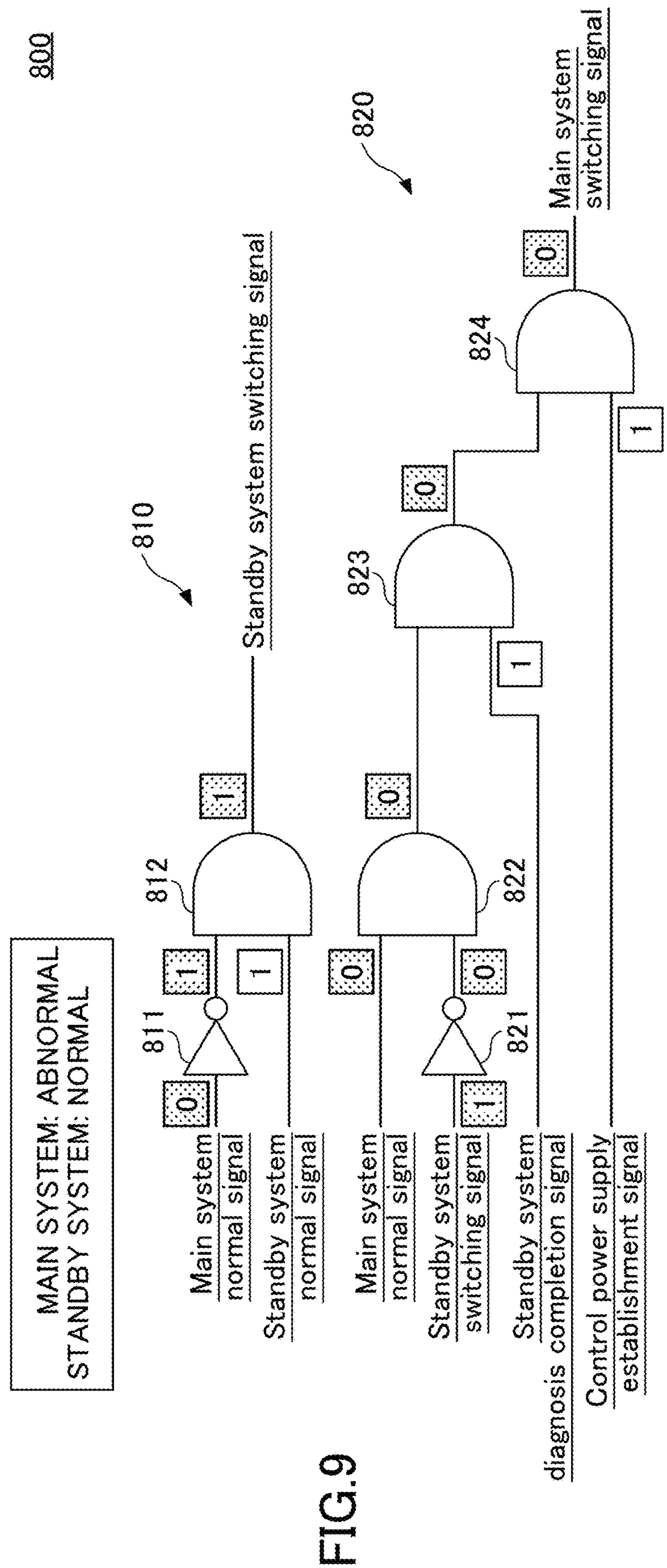
FIG. 9 is a diagram illustrating the logic circuit corresponding to the example of the switching method for the switching circuitry.
Figure 10:
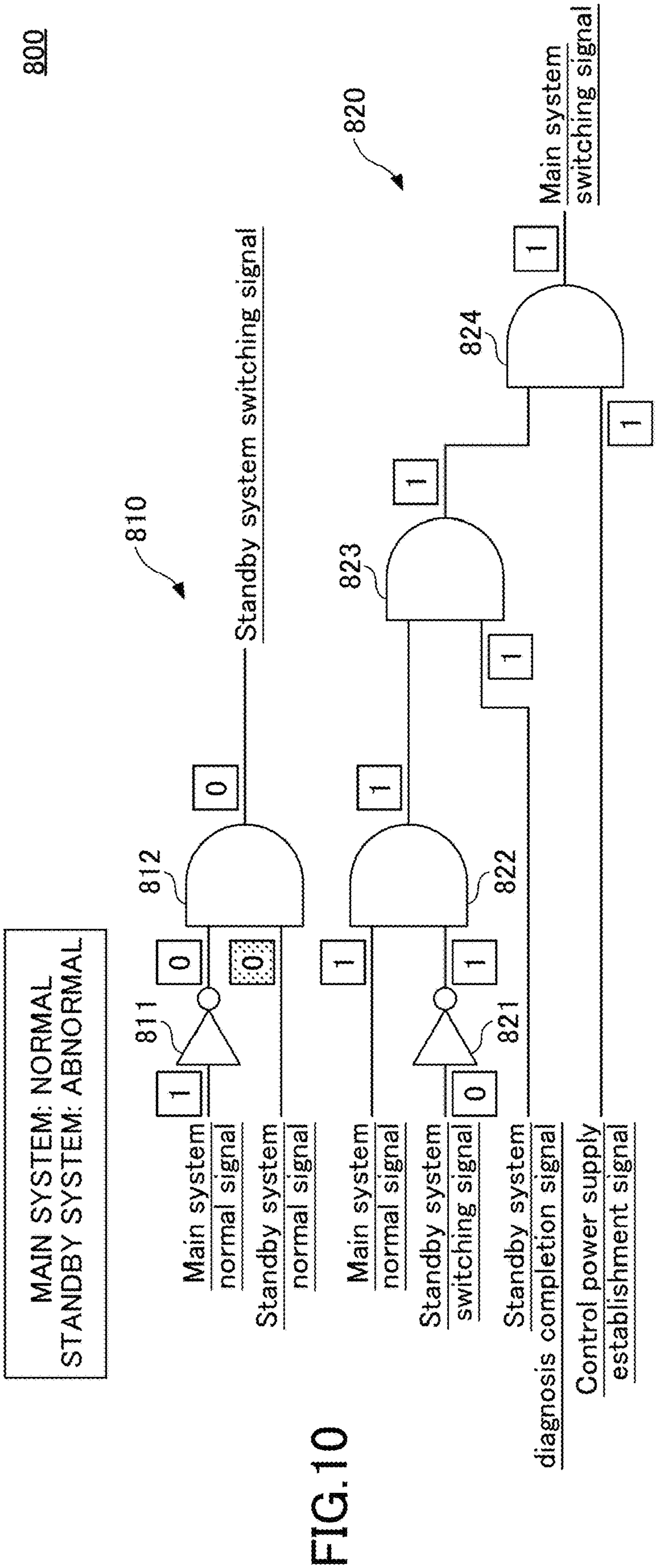
FIG. 10 is a diagram illustrating the logic circuit corresponding to the example of the switching method for the switching circuitry.
Figure 11:
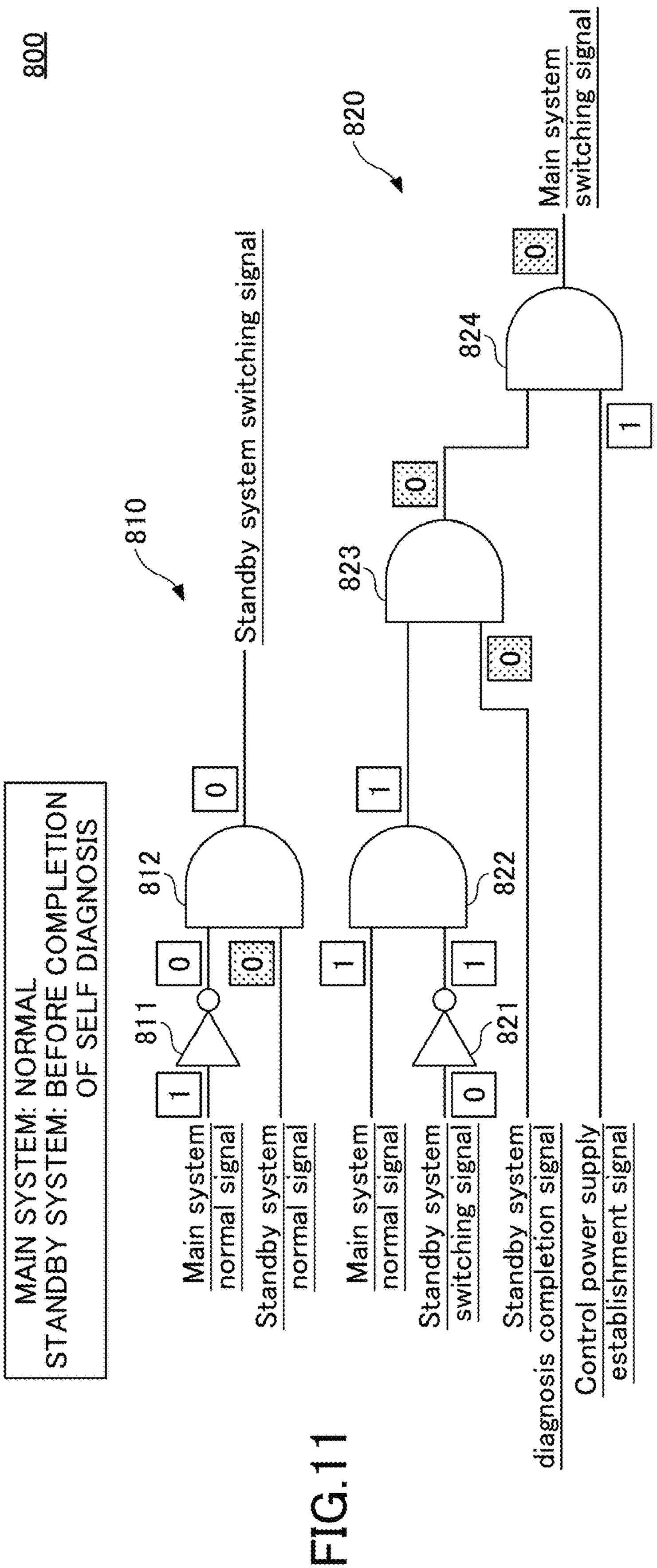
FIG. 11 is a diagram illustrating the logic circuit corresponding to the example of the switching method for the switching circuitry.

FIG. 8 through FIG. 11 are diagrams illustrating a logic circuit 800 corresponding to an example of the switching method of the switching circuitries 130 and 140. More particularly, FIG. 8 is a diagram illustrating a state of the logic circuit 800 when the self diagnosis results of both the main system controller 110 and the standby system controller 120 are normal. FIG. 9 is a diagram illustrating a state of the logic circuit 800 when the self diagnosis result of only the main system controller 110, between the self diagnosis results of the main system controller 110 and the standby system controller 120, indicates the abnormality. FIG. 10 is a diagram illustrating a state of the logic circuit 800 when the self diagnosis result of only the standby system controller 120, between the self diagnosis results of the main system controller 110 and the standby system controller 120, indicates the abnormality. FIG. 11 is a diagram illustrating a state of the logic circuit 800 when the self diagnosis result of the main system controller 110 is normal, and the self diagnosis result of standby system controller 120 is before completion (that is, the standby system controller 120 has not yet completed the self diagnosis thereof).

The logic circuit 800 may be implemented by hardware in the main system controller 110 or the standby system controller 120, more particularly, in the input signal detecting circuit 113 or the input signal detecting circuit 123, for example. In addition, the logic circuit 800 may be built into each of the switching circuitries 130 and 140 by hardware, for example.

In addition, the functions of the logic circuit 800 may be implemented by software in the main system controller 110 or the standby system controller 120, more particularly, in the input signal detecting circuit 113 or the input signal detecting circuit 123, for example, in place of providing the logic circuit 800. Similarly, the functions of the logic circuit 800 may be implemented by software in each of the switching circuitries 130 and 140, for example.

As illustrated in FIG. 8 through FIG. 11, the logic circuit 800 includes a logic circuit 810, and a logic circuit 820.

The logic circuit 810 includes a NOT gate 811, and an AND gate 812.

The NOT gate 811 receives a main system normal signal, and inverts the main system normal signal before outputting the same.

The main system normal signal is a signal indicating whether or not the self diagnosis result of the main system controller 110 is normal. The main system normal signal has a high (H) level ("1") when the self diagnosis result of the main system controller 110 is normal, and a low (L) level ("0") when the self diagnosis result indicates the abnormality.

The AND gate 812 outputs a logical product of an output of the NOT gate 811, and a standby system normal signal, as a standby system switching signal.

The standby system normal signal is a signal indicating whether or not the self diagnosis result of the standby system controller 120 is normal. The standby system control signal has a high (H) level ("1") when the self diagnosis result of the standby system controller 120 is normal, and a low (L) level ("0") when the self diagnosis result indicates the abnormality.

The standby system switching signal is a signal indicating whether or not the control entity related to the opening or closing operation of the door 80 is switched from the main system controller 110 to the standby system controller 120. The standby system switching signal has a high (H) level ("1") when the control entity related to the opening or closing operation of the door 80 is switched from the main system controller 110 to the standby system controller 120, and has a low (L) level ("0") when not switching the control entity. For example, when the abnormality is generated in the main system controller 110 during the service of the train including the railway vehicle 1, the door controller 100 can switch the connection source of the output target of the switching circuitries 130 and 140 from the main system controller 110 to the standby system controller 120, by checking that the standby system switching signal rises to the H level.

The logic circuit 820 includes a NOT gate 821, and AND gates 822 through 824.

The NOT gate 821 receives a standby system switching signal, and inverts the standby system switching signal before outputting the same.

The AND gate 822 outputs a logical product of the main system normal signal, and an output of NOT gate 821.

The AND gate 823 outputs a logical product of the output of AND gate 822, and a standby system diagnosis completion signal.

The standby system diagnosis completion signal is a signal indicating whether or not the self diagnosis process of the standby system controller 120 is completed. The standby system diagnosis completion signal has a high (H) level ("1") when the self diagnosis process of the standby system controller 120 is completed, and a low (L) level ("0") when the self diagnosis process of the standby system controller 120 is not completed.

The AND gate 824 outputs a logical product of the output of the AND gate 823, and a control power supply establishment signal, as a main system switching signal.

The main system switching signal is a signal indicating whether or not the connection source of the output target of the switching circuit circuitries 130 and 140 is switched from the standby system controller 120 to the main system controller 110 in the start sequence process. The main system switching signal has a high (H) level ("1") when the connection source of the output target of the switching circuitries 130 and 140 is switched from the standby system controller 120 to the main system controller 110, and has a low (L) level ("0") when the connection source is not switched to the main system controller 110 but is maintained to the standby system controller 120.

As illustrated in FIG. 8, when the self diagnosis results of the main system controller 110 and the standby system controller 120 are both normal, the main system normal signal and the standby system normal signal both have the H level ("1"). For this reason, the AND gate 812 receives a L-level ("0"") signal which is obtained by inverting the main system normal signal by the NOT gate 811, and a H-level ("1") standby system normal signal, and outputs a L-level ("0") standby system switching signal.

In addition, as illustrated in FIG. 8, the AND gate 822 receives a H-level ("1") main system normal signal, and a H-level ("1") which is obtained by inverting a L-level standby system switching signal by the NOT gate 821, and outputs a signal having a H level ("1").

Further, the self diagnosis process of the standby system controller 120 is already completed. Accordingly, the AND gate 823 receives the H-level ("1") signal output from the AND gate 822, and the H-level ("1") standby system diagnosis completion signal, and outputs a H-level ("1") signal.

Moreover, the main system controller 110 and the standby system controller 120 already completed the self diagnosis process thereof, and the control power of the door controller 100 is already established. For this reason, the AND gate 824 receives the H-level ("1") signal output from the AND gate 823, and the H-level ("1") control power supply establishment signal, and outputs a H-level ("1") main system switching signal.

Accordingly, the logic circuit 820 can output the main system switching signal for switching the switching circuitries 130 and 140 to the state where the main system controller 110 and the output target are connected according to the condition (2) described above (for example, refer to step S122 illustrated in FIG. 5).

As illustrated in FIG. 9, when the self diagnosis result of only the main system controller 110, between the self diagnosis results of the main system controller 110 and the standby system controller 120, indicates the abnormality, the main system normal signal has the L level ("0"), and the standby system normal signal has the H level ("1"). For this reason, the AND gate 812 receives the H-level ("1") signal which is obtained by inverting the L-level main system normal signal by the NOT gate 811, and the H-level standby system normal signal, and outputs a H-level ("1") standby system switching signal. Accordingly, the door controller 100 can switch the control entity of the opening or closing operation of the door 80 from the main system controller 110 having the self diagnosis result indicating the "abnormality" to the standby system controller 120, according to the H-level standby system switching signal.

As illustrated in FIG. 9, the AND gate 822 receives the L-level ("0") main system normal signal, and a L-level ("0") which is obtained by inverting the H-level ("1") signal by the NOT gate 821, and outputs a L-level ("0") signal.

The AND gate 823 receives the L-level ("0") signal output from the AND gate 822, and a H-level ("1") standby system diagnosis completion signal, and outputs a L-level ("0") signal.

The AND gate 824 receives the L-level ("0") signal output from the AND gate 823, and the H-level ("1") control power supply establishment signal, and outputs a L-level ("0") main system switching signal.

Accordingly, the logic circuit 820 can output the main system switching signal for maintaining the switching circuitries 130 and 140 in the state where the standby system controller 120 and the output target are connected, according to the condition (3) described above.

As illustrated in FIG. 10, when the self diagnosis result of only the standby system controller 120, between the self diagnosis results of the main system controller 110 and the standby system controller 120, indicates the abnormality, the main system normal signal has the H level ("1"), and the standby system normal signal has the L level ("0"). For this reason, the AND gate 812 receives a L-level ("0") signal which is obtained by inverting the H-level main system normal signal by the NOT gate 811, and the L-level standby system normal signal, and outputs a L-level ("0") standby system switching signal. Accordingly, the door controller 100 can maintain the control entity related to the opening or closing operation of the door 80 to the main system controller 110 having the self diagnosis result that is "normal", according to the L-level standby system switching signal.

As illustrated in FIG. 10, because the state of the logic circuit 820 in this example is the same as that of FIG. 8, a description thereof will be omitted.

Accordingly, the logic circuit 820 can output the main system switching signal for maintaining the switching circuitries 130 and 140 in the state where the standby system controller 120 and the output target are connected, according to the condition (4) described above.

As illustrated in FIG. 11, between the main system controller 110 and the standby system controller 120, the self diagnosis process of the main system controller 110 is completed and the diagnosis result thereof indicates "normal", but the self diagnosis process of the standby system controller 120 is incomplete (not yet completed). In this case, the main system normal signal has the H level ("1"), and the standby system normal signal has the L level ("0"). For this reason, the AND gate 812 receives a L-level ("0") signal which is obtained by inverting the H-level main system normal signal by the NOT gate 811, and the L-level ("0") standby system normal signal, and outputs a L-level ("0") standby system switching signal.

As illustrated in FIG. 11, the AND gate 822 receives the H-level ("1") main system normal signal, and a H-level ("1") signal which is obtained by inverting the L-level standby system switching signal by the NOT gate 821, and outputs a H-level ("1") signal.

In addition, because the self diagnosis process of the standby system controller 120 is incomplete, the standby system diagnosis completion signal has the L level ("0""). For this reason, the AND gate 823 receives the H-level ("1"") signal output from the AND gate 822, and the L-level ("0") standby system diagnosis completion signal, and outputs a L-level ("0") signal.

Moreover, the AND gate 824 receives the L-level ("0") signal output from the AND gate 823, and the H-level ("1") control power supply establishment signal, and outputs a L-level ("0") main system switching signal.

Hence, the logic circuit 820 can output the main system switching signal for causing the switching circuitries 130 and 140 to wait without switching the state to the state where the main system controller 110 and the output target are connected, until the self diagnosis process of the standby system controller 120 is completed, according to the condition (5) described above.

Accordingly to each of the embodiments described above, it is possible to provide a technique capable of appropriately operating a redundant control system for a door of a railway vehicle.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

All examples and conditional language recited herein are intended for pedagogical purposes to aid the reader in understanding the invention and the concepts contributed by the inventor to furthering the art, and are to be construed as being without limitation to such. More particularly, recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus comprising:

a first controller configured to control an operation of a door of a railway vehicle, said operation of the door being driven by an electric motor;

a second controller capable of controlling the operation of the door; and a diagnosis tester configured to perform a diagnosis related to an abnormality in the second controller when performing a start process which accompanies turning on power of the control apparatus in a state where neither the first controller nor the second controller outputs power to the electric motor.

2. The control apparatus as claimed in claim 1, wherein the second controller controls the operation of the door when an abnormality is generated in the first controller.

3. The control apparatus as claimed in claim 1, further comprising:

a service abort circuit configured to abort the operation of the door, when the diagnosis tester diagnoses an abnormality in the second controller when performing the start process which accompanies turning on power of the control apparatus.

4. The control apparatus as claimed in claim 1, wherein the first controller includes a first drive circuit configured to drive the electric motor which drives the door, or a locking device which locks or releases the door, by the power from a power supply, and a first drive control circuit configured to control the first drive circuit, the second controller includes a second drive circuit capable of driving the electric motor or the locking device, by the power from the power supply, and a second drive control circuit configured to control the second drive circuit, and the control apparatus further comprising:

a switching circuitry capable of switching between supplying the power from the first drive circuit and supplying the power from the second drive circuit, to the electric motor or the locking device, wherein the switching circuitry switches between a state where the power from the first drive circuit is supplied to the electric motor, and a state where the power from the second drive circuit is supplied to the electric motor, when performing the start process which accompanies turning on the power of the control apparatus.

5. The control apparatus as claimed in claim 4, wherein the diagnosis tester diagnoses an abnormality in the second drive control circuit, when performing the start process which accompanies turning on the power of the control apparatus, the second drive control circuit controls the second drive circuit to output the power, when a diagnosis related to the abnormality in the second drive control circuit is completed, and the switching circuitry is in the state capable of supplying the power from the second drive circuit to the electric motor or the locking device, and switches to the state capable of supplying the power from the first drive circuit to the electric motor or the locking device, when performing the start process which accompanies turning on the power of the control apparatus.

6. The control apparatus as claimed in claim 5, wherein the second controller includes a communication device configured to communicate with an external device, and the diagnosis tester performs a diagnosis related to an abnormality in the communication device, after completion of diagnosis related to the second drive circuit and the second drive control circuit.

7. The control apparatus as claimed in claim 4, wherein the diagnosis tester includes a first diagnosing circuit configured to diagnose an abnormality in the first drive control circuit when performing the start process which accompanies turning on the power of the control apparatus, and a second diagnosing circuit configured to diagnose an abnormality in the second drive control circuit when performing the start process which accompanies turning on the power of the control apparatus, and the switching circuitry is in the state capable of supplying the power from the second drive circuit to the electric motor or the locking device, and switches to the state capable of supplying the power from the first drive circuit to the electric motor or the locking device if a diagnosis result related to the first drive control circuit by the first diagnosing circuit is normal, when performing the start process which accompanies turning on the power of the control apparatus.

8. The control apparatus as claimed in claim 4, wherein the switching circuitry switches to a state capable of supplying the power from the second drive circuit to the electric motor, if the switching circuitry is in a state capable of supplying the power from the first drive circuit when turning off the power of the control apparatus.

9. The control apparatus as claimed in claim 1, wherein the second controller outputs the power to the electric motor upon determining that a result of the diagnosis is normal.

10. A control method to be executed by a control apparatus including a first controller configured to control an operation of a door of a railway vehicle, and a second controller capable of controlling the operation of the door, said operation of the door being driven by an electric motor, the control method comprising:

performing a diagnosis related to an abnormality in the second controller when performing a start process which accompanies turning on power of the control apparatus in a state where neither the first controller nor the second controller outputs power to the electric motor.

11. The control method as claimed in claim 10, wherein the second controller controls the operation of the door when an abnormality is generated in the first controller.

12. The control method as claimed in claim 10, further comprising:

aborting the operation of the door, when the performing the diagnosis diagnoses an abnormality in the second controller when performing the start process which accompanies turning on power of the control apparatus.

* * * * *